US012240188B2

(12) United States Patent
Reyneke et al.

(10) Patent No.: US 12,240,188 B2
(45) Date of Patent: Mar. 4, 2025

(54) APPARATUS AND METHOD FOR MANUFACTURING THERMOPLASTIC WRINKLE COUPONS

(71) Applicant: The Boeing Company, Chicago, IL (US)

(72) Inventors: Greg M. Reyneke, Everett, WA (US); Aaron R. Cowin, Dardenne Prairie, MO (US); Michael H. Larson, Mercer Island, WA (US); Kenndy San, Wentzville, MO (US); Emma L. Morrissey, Saint Louis, MO (US); Andrew D. Wilkerson, Wentzville, MO (US)

(73) Assignee: The Boeing Company, Arlington, VA (US)

( * ) Notice: Subject to any disclaimer, the term of this patent is extended or adjusted under 35 U.S.C. 154(b) by 187 days.

(21) Appl. No.: 17/937,456

(22) Filed: Oct. 2, 2022

(65) Prior Publication Data

US 2023/0347599 A1 Nov. 2, 2023

Related U.S. Application Data

(60) Provisional application No. 63/364,018, filed on May 2, 2022.

(51) Int. Cl.
*B29C 70/34* (2006.01)
*B29C 70/54* (2006.01)
(Continued)

(52) U.S. Cl.
CPC .......... *B29C 70/345* (2013.01); *B29C 70/545* (2013.01); *B29K 2071/00* (2013.01);
(Continued)

(58) Field of Classification Search
CPC ...... B29C 70/345; B29C 70/00; B29C 70/545
See application file for complete search history.

(56) References Cited

U.S. PATENT DOCUMENTS 5,039,371 A * 8/1991 Cremens ................. B29C 33/02
156/286
5,292,475 A * 3/1994 Mead .................... B29C 37/005
264/258

(Continued)

FOREIGN PATENT DOCUMENTS

| CA | 2983956 | 9/2018 |
|---|---|---|
| EP | 2472254 | 7/2012 |

OTHER PUBLICATIONS

Saraiva, "Development of press forming techniques for thermoplastic composites: Investigation of a multiple step forming approach," Published 2017, Materials Science Engineering, available at <http://resolver.tudelft.nl/uuid:28226034-774c-4a5e-a11a-39106f55da53>.

*Primary Examiner* — Andrew D Graham

(57) ABSTRACT

A method of manufacturing a wrinkle coupon includes providing a thermoplastic laminate having a laminate outer surface and opposing laminate side edges, and comprised of multiple plies. Each ply is comprised of reinforcing fibers pre-impregnated with thermoplastic resin. The method additionally includes placing a wrinkle-forming element across the laminate outer surface such that the wrinkle-forming element extends between the laminate side edges. In addition, the method includes applying heat to the thermoplastic laminate, and applying compaction pressure on the wrinkle-forming element against the laminate outer surface in a manner urging the wrinkle-forming element into the thermoplastic laminate, and causing the wrinkle-forming element to form a wrinkle as an out-of-plane deformation in one or more of the plies. The method also includes allowing the thermoplastic laminate to cool, and cutting a wrinkle (Continued)

coupon out of a region of the thermoplastic laminate containing the wrinkle.

20 Claims, 14 Drawing Sheets

(51) Int. Cl.
    *B29K 71/00*                 (2006.01)
    *B29K 307/04*             (2006.01)
    *B29K 309/08*             (2006.01)
    *B29L 9/00*                  (2006.01)

(52) U.S. Cl.
    CPC ...... *B29K 2307/04* (2013.01); *B29K 2309/08* (2013.01); *B29L 2009/00* (2013.01)

(56) References Cited

U.S. PATENT DOCUMENTS

| | | | |
|---|---|---|---|
| 7,357,014 B2 | 4/2008 | Vaccaro | |
| 8,365,429 B2* | 2/2013 | Lawrence | G01N 3/08 33/529 |
| 8,371,036 B2* | 2/2013 | Lawrence | B29C 66/5221 33/529 |
| 8,499,632 B1 | 8/2013 | Ihn | |
| 9,090,042 B2* | 7/2015 | Elliott | B32B 3/08 |
| 9,519,844 B1 | 12/2016 | Thompson | |
| 9,731,457 B2* | 8/2017 | Kline | B29C 70/543 |
| 2007/0089479 A1 | 4/2007 | Vaccaro | |
| 2007/0175031 A1* | 8/2007 | Pham | B64C 1/12 29/889.2 |
| 2008/0148865 A1* | 6/2008 | Mlinar | B29C 70/543 264/238 |
| 2008/0283177 A1* | 11/2008 | Glain | B29C 70/44 52/127.3 |
| 2010/0009124 A1* | 1/2010 | Robins | B29C 33/405 156/185 |
| 2010/0024964 A1* | 2/2010 | Ingram, Jr. | B29C 70/32 156/189 |
| 2010/0043957 A1* | 2/2010 | Baril | B29C 70/30 156/196 |
| 2011/0094307 A1* | 4/2011 | Seok | G01N 3/20 73/851 |
| 2013/0129526 A1* | 5/2013 | Williams | B29C 70/462 156/196 |
| 2013/0156979 A1* | 6/2013 | Stewart | B29C 70/86 428/35.8 |
| 2013/0188858 A1 | 7/2013 | Lin | |
| 2014/0127473 A1* | 5/2014 | Kline | B29C 33/42 156/196 |
| 2014/0333758 A1 | 11/2014 | Wu | |
| 2015/0044430 A1* | 2/2015 | Lee | B29C 70/543 156/221 |
| 2016/0349160 A1 | 12/2016 | Esposito | |
| 2017/0080651 A1* | 3/2017 | Matlack | B29C 70/56 |
| 2018/0036967 A1* | 2/2018 | Deck | B29C 70/36 |
| 2018/0120268 A1 | 5/2018 | Georgeson | |
| 2018/0172645 A1 | 6/2018 | Fieni | |
| 2018/0272629 A1* | 9/2018 | Burnett | G01M 5/0033 |
| 2018/0275030 A1* | 9/2018 | Lee | B29C 70/545 |
| 2019/0096540 A1* | 3/2019 | Baughman | B29C 70/14 |
| 2019/0277808 A1 | 9/2019 | Grewal | |
| 2019/0322059 A1* | 10/2019 | Choudhari | B29C 70/541 |
| 2019/0389681 A1* | 12/2019 | Miller, II | B65H 16/005 |
| 2021/0208112 A1 | 7/2021 | Gayle | |

* cited by examiner

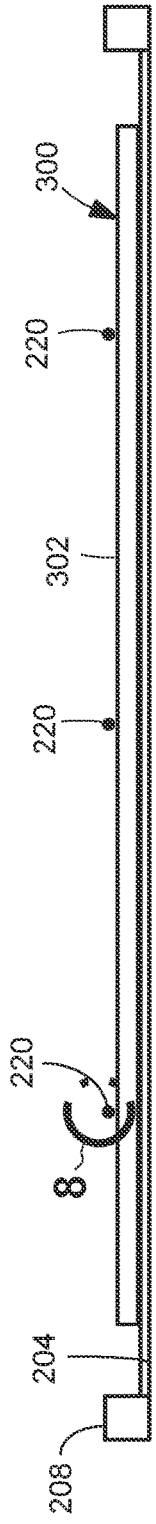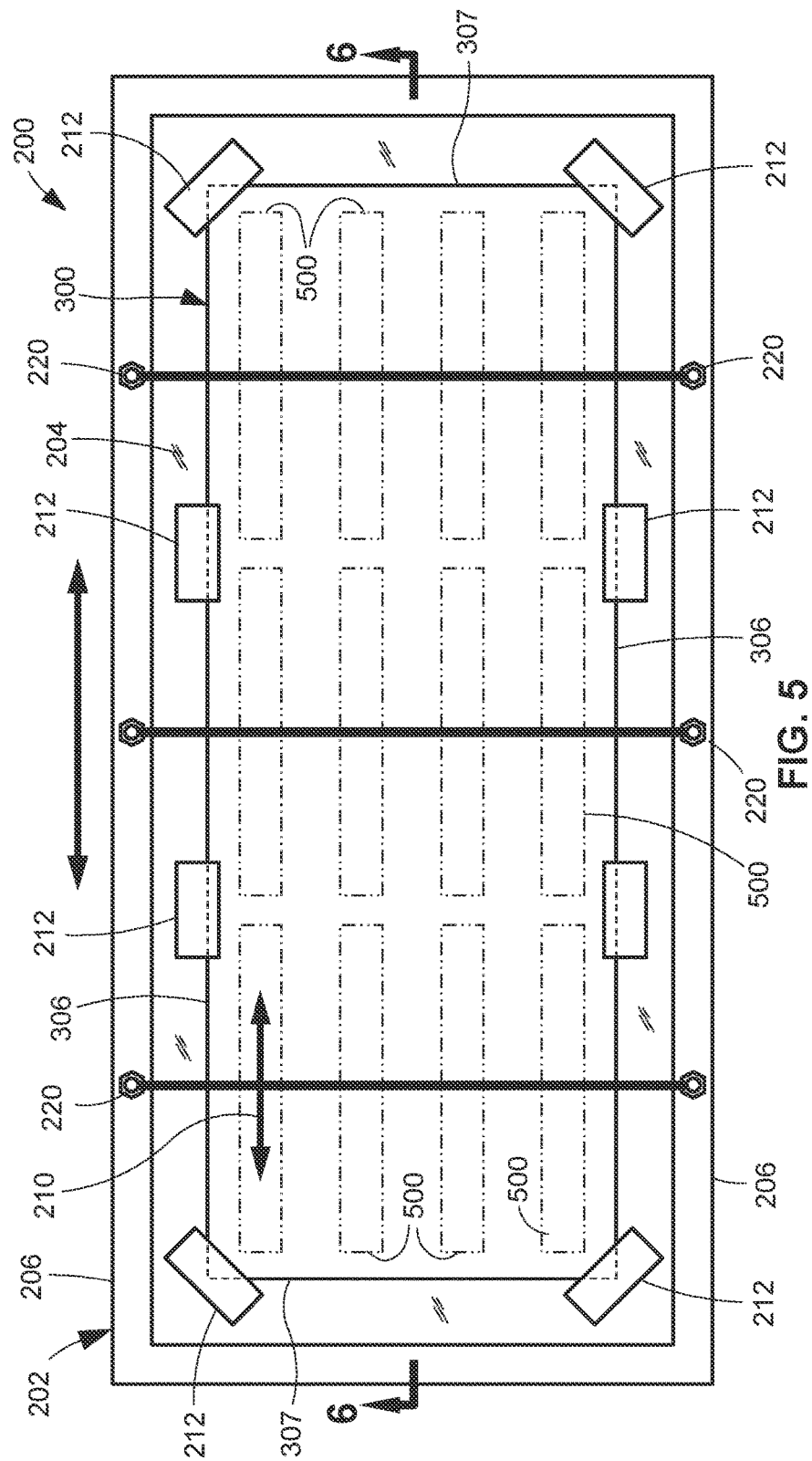

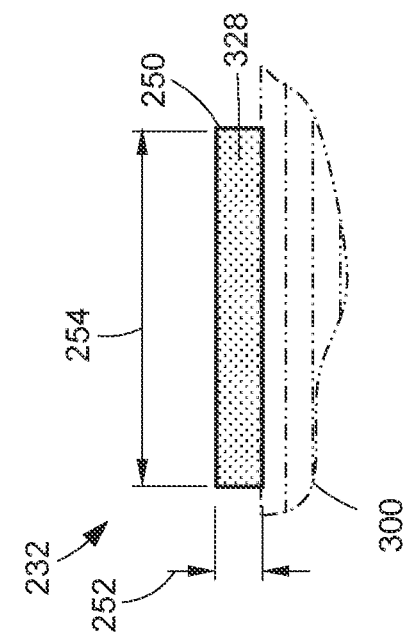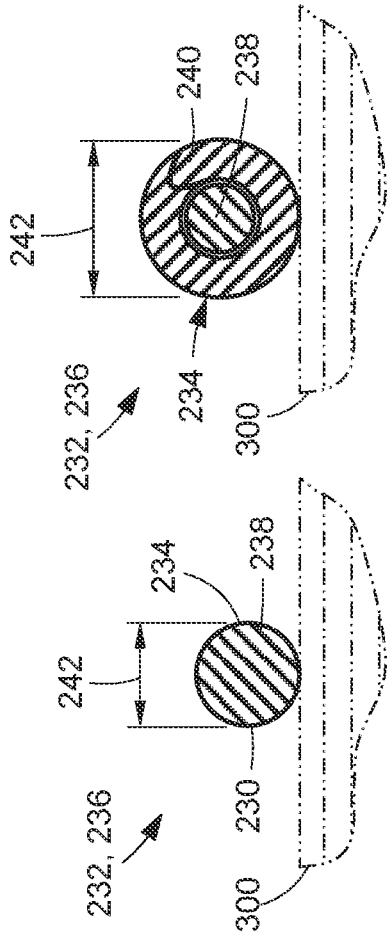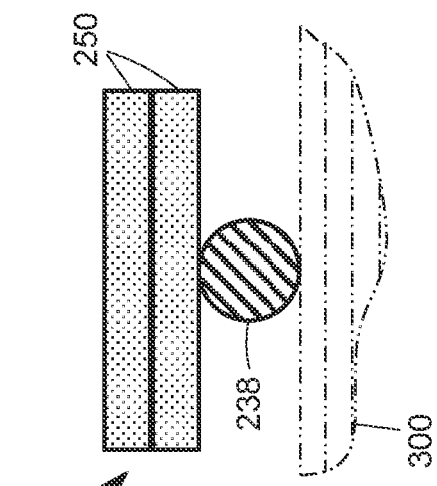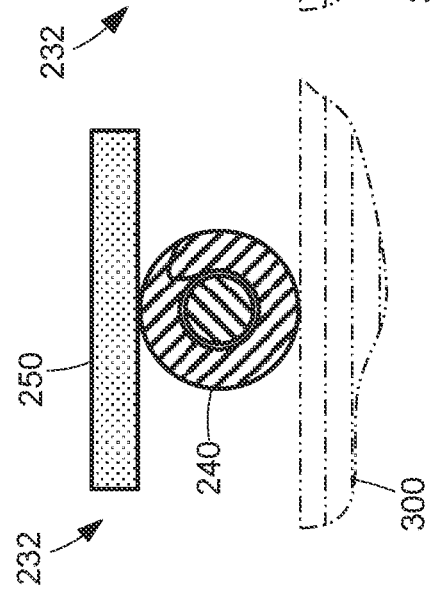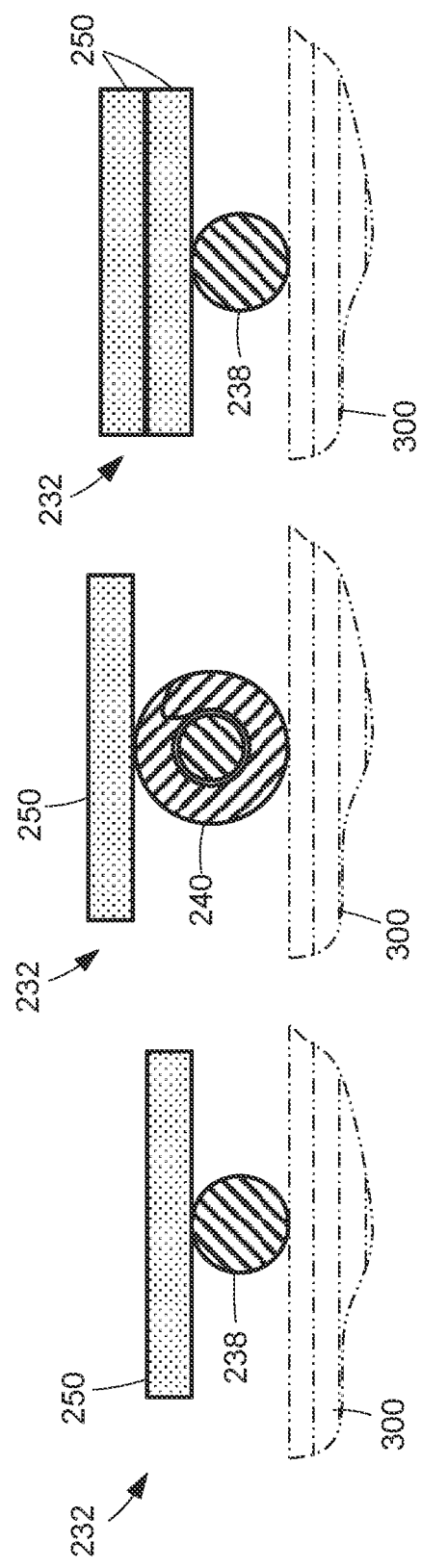

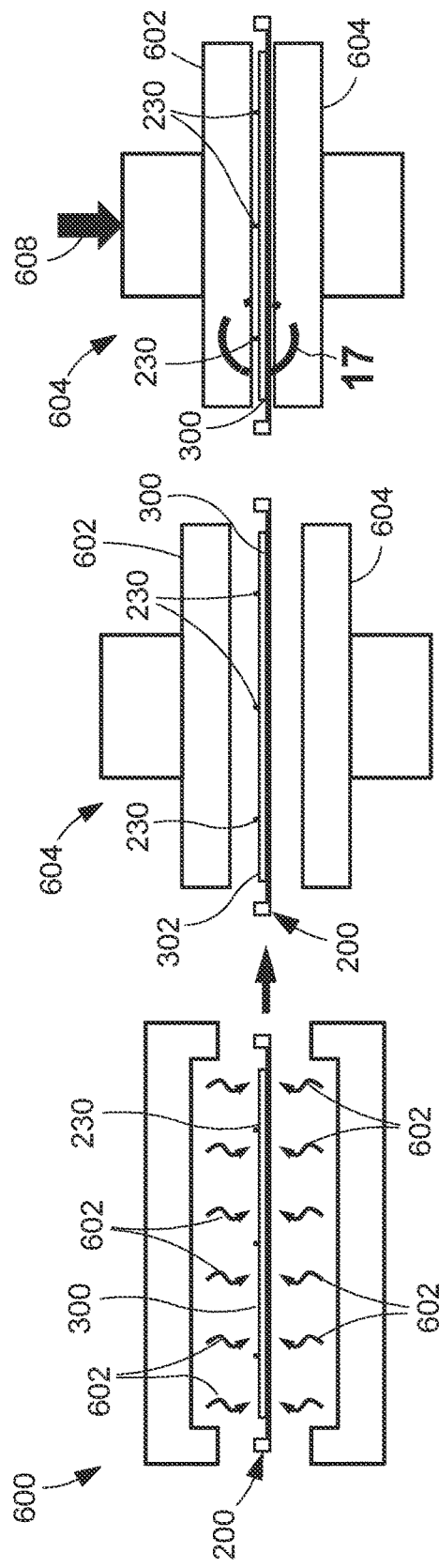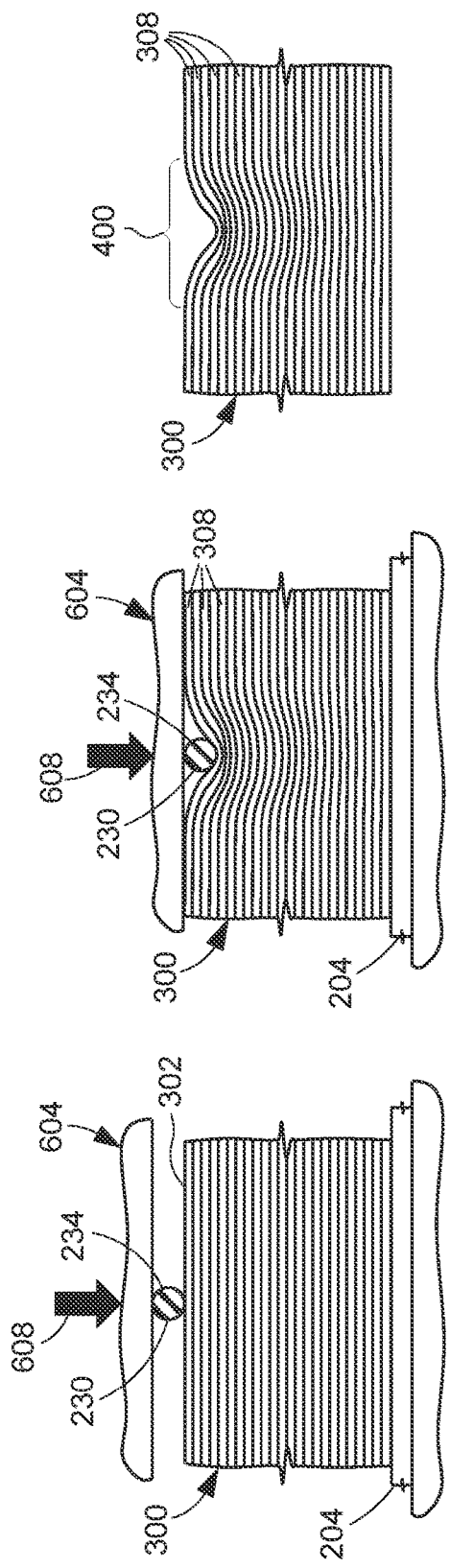

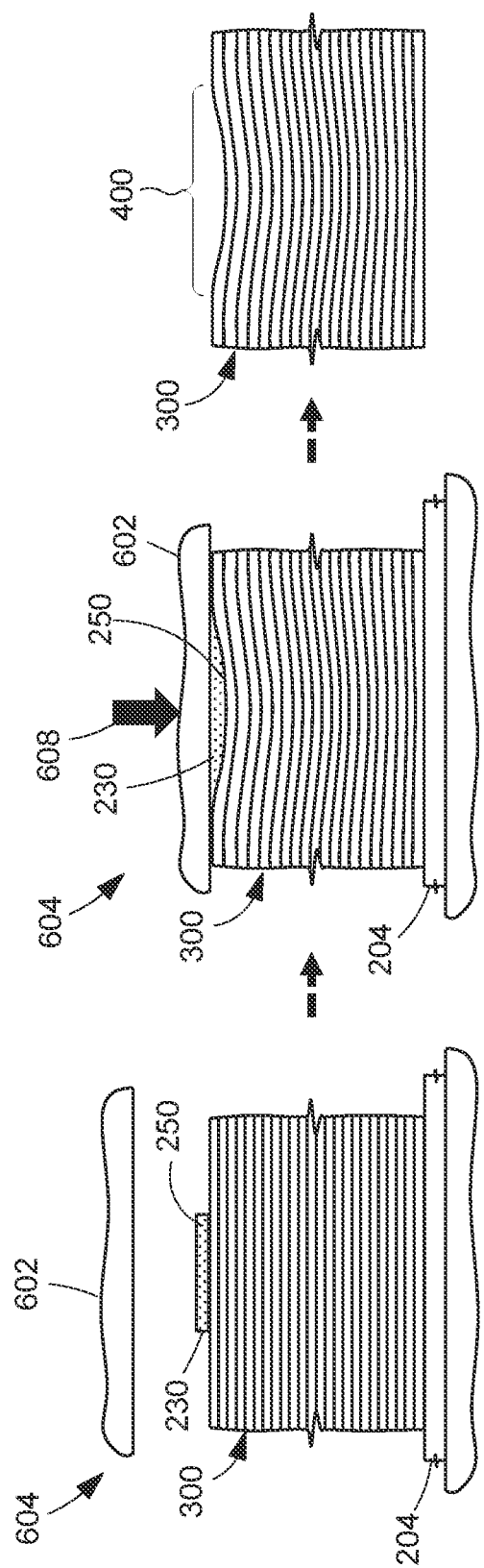

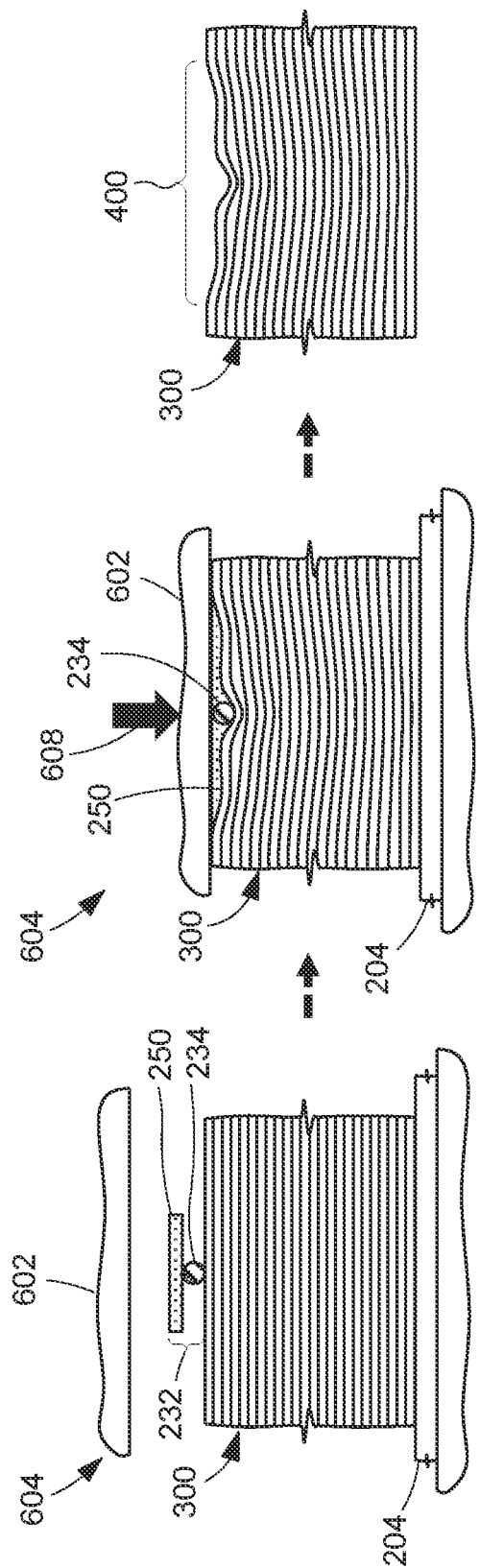

APPARATUS AND METHOD FOR MANUFACTURING THERMOPLASTIC WRINKLE COUPONS

CROSS-REFERENCE TO RELATED APPLICATION

This non-provisional application claims priority to U.S. Provisional Application Ser. No. 63/364,018, entitled APPARATUS AND METHOD FOR MANUFACTURING THERMOPLASTIC WRINKLE COUPONS, filed May 2, 2022, and which is incorporated herein by reference in its entirety.

FIELD

The present disclosure relates generally to composites manufacturing and, more specifically, to the manufacturing of thermoplastic coupons containing predefined ply wrinkles, for use in characterizing the effect of such wrinkles on the mechanical properties of thermoplastic laminates.

BACKGROUND

Composite structures provide several advantages over metallic structures. For example, composite structures can have a higher specific stiffness and higher specific strength than metallic structures. Furthermore, composite structures can be tailored to provide a relatively high degree of strength and stiffness along the primary structural load path of the composite structure. The ability to tailor the strength and stiffness of composites typically results in lighter weight structures than metallic structures. In addition, composite structures may have higher fatigue resistance and higher corrosion resistance than metallic structures.

Thermoplastic laminates are a type of composite structure, formed as a stack of relatively thin plies that are laminated together. Each ply in a thermoplastic laminate includes reinforcing fibers, such as carbon fibers, which serve as the primary load-carrying constituent. In each ply, the fibers may be parallel to each other, and are held in position by a matrix constituent, such as thermoplastic resin. The matrix constituent distributes or transfer loads between adjacent fibers, so that the fibers can share in carrying the structural loads on the composite laminate.

The manufacturing of thermoplastic laminates can present certain challenges. For example, in thermoplastic laminates, wrinkles can occur. A wrinkle in a ply may be described as a localized out-of-plane deformation of the intended contour of the ply. A wrinkle also represents a deviation in the path of the fibers in the ply, causing the load in the fibers to transition around the wrinkle, and affecting the ability of the deviated fibers to share in carrying the structural loads on the thermoplastic laminate. Generally, the greater the deviation of the fibers, the lower the ability of the deviated fibers to share in load-carrying with complexly-shaped adjacent fibers.

After the manufacturing of a thermoplastic laminate is complete, an inspection is typically performed to assess the quality of the laminate. When a wrinkle is detected during inspection, the conventional practice is to evaluate the effect of the wrinkle on the mechanical properties (e.g., the strength) of the laminate. Due to a lack of design data on the effects of wrinkles, a time-consuming strength analysis must be performed on a case-by-case basis to assess the strength of the laminate. Engineering judgment is then used to disposition the laminate, which may include either accepting the laminate as is, reworking the laminate, or rejecting the laminate.

As may be appreciated, the need for case-by-case analysis of a thermoplastic laminate containing wrinkles, and the need to rework or replace certain laminates due to the occurrence of wrinkles can increase the development time of a new product, and/or can reduce the manufacturing rate of an existing production program. In addition, uncertainty about the effects of wrinkle of different sizes and geometries may result in the costly and time-consuming rework or replacement of a laminate that may potentially be acceptable if evaluated according to accurate design data.

As can be seen, there exists a need in the art for a means for understanding the effects of wrinkles on the strength of a thermoplastic laminate without the need for analysis on a case-by-case basis. Preferably, such means for understanding the effects of wrinkles on laminates also allows for developing design data for characterizing wrinkles having predefined wrinkle geometries.

SUMMARY

The above-noted needs associated with manufacturing thermoplastic laminates are addressed by the present disclosure, which provides a method of manufacturing a wrinkle coupon for of thermoplastic material. The method comprises providing a thermoplastic laminate having a laminate outer surface and opposing laminate side edges, and comprised of multiple plies, each ply comprised of reinforcing fibers pre-impregnated with thermoplastic resin. The method also includes placing at least one wrinkle-forming element across the laminate outer surface, such that the wrinkle-forming element extends between the laminate side edges. In addition, the method includes applying heat to the thermoplastic laminate to soften the thermoplastic resin. Furthermore, the method includes applying compaction pressure on the wrinkle-forming element against the laminate outer surface in a manner urging the wrinkle-forming element into the thermoplastic laminate, and causing the wrinkle-forming element to form a wrinkle as an out-of-plane deformation in one or more of the plies. Additionally, the method includes allowing the thermoplastic laminate to cool, and then cutting a wrinkle coupon out of a region of the thermoplastic laminate containing the wrinkle.

Also disclosed is a method of manufacturing a set of wrinkle coupons, comprising providing a thermoplastic laminate having a laminate outer surface and opposing laminate side edges. The thermoplastic laminate is comprised of multiple plies of thermoplastic prepreg material, and each ply is comprised of reinforcing fibers pre-impregnated with thermoplastic resin. The thermoplastic laminate has a laminate configuration comprising at least the following: type of thermoplastic prepreg material, and ply stacking sequence. The method additionally includes placing a wrinkle-forming element across the laminate outer surface such that the wrinkle-forming element extends between the laminate side edges. Furthermore, the method includes applying heat to the thermoplastic laminate to soften the thermoplastic resin, followed by applying compaction pressure on the wrinkle-forming element against the laminate outer surface in a manner urging the wrinkle-forming element into the thermoplastic laminate, and causing the wrinkle-forming element to form a wrinkle as an out-of-plane deformation in one or more of the plies. The method then includes allowing the thermoplastic laminate to cool, and cutting a wrinkle coupon out of a region of the thermoplastic laminate containing the wrinkle. The method further includes determining a wrinkle geometry of the wrinkle in at least one wrinkled ply, by measuring a wrinkle length and a wrinkle depth of the wrinkle in the wrinkled ply. The method also includes repeating the above steps at least one time for the same laminate configuration, each time using a wrinkle-forming element having a different wrinkle-forming-element configuration than previously used, to thereby produce a wrinkle coupon having a different wrinkle geometry than previously produced.

Additionally disclosed is a frame-laminate assembly for forming at least one wrinkle in a thermoplastic laminate. The frame-laminate assembly includes a thermoplastic laminate having a laminate outer surface and opposing laminate side edges, and comprised of multiple plies. Each ply is comprised of reinforcing fibers pre-impregnated with thermoplastic resin. The frame-laminate assembly also includes a laminate support frame, having a frame panel configured to support the thermoplastic laminate. The frame panel extends between opposing frame side members respectively located adjacent to the laminate side edges. Furthermore, the frame-laminate assembly includes at least one wrinkle-forming element configured to extend across the laminate surface between the laminate side edges. Additionally, the frame-laminate assembly includes a pair of wrinkle-forming-element attachment mechanisms for each wrinkle-forming element. The wrinkle-forming-element attachment mechanisms are located respectively on the frame side members, and are configured to secure opposing ends of the wrinkle-forming element. The wrinkle-forming-element attachment mechanisms are configured to support the wrinkle-forming element during the application of heat to the thermoplastic laminate, and during the application of compaction pressure on the wrinkle-forming element against the laminate outer surface, for urging the wrinkle-forming element into the thermoplastic laminate, thereby causing each wrinkle-forming element to form a wrinkle as an out-of-plane deformation in one or more of the plies.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 5 is a top view of the frame-laminate assembly of FIG. 3;

FIG. 6 is a sectional view of the frame-laminate assembly, taken along line 6-6 of FIG. 3;

FIG. 8 is a magnified cross-sectional view of the portion of the thermoplastic laminate of FIG. 5, and showing an example of a wrinkle-forming element configured as a straight wire;

FIG. 9 is a cross-sectional view of an example of a wrinkle-forming element configured as a coiled wire surrounding a straight wire;

FIG. 10 is a cross-sectional view of an example of a wrinkle-forming element configured as a tow strip;

FIG. 11 is a cross-sectional view of an example of a wrinkle-forming element configured as a straight wire covered by a tow strip;

FIG. 12 is a cross-sectional view of an example of a wrinkle-forming element configured as a coiled wire surrounding a straight wire, and covered by a tow strip;

FIG. 13 is a cross-sectional view of an example of a wrinkle-forming element configured as a straight wire covered by multiple tow strips;

FIG. 14 is a schematic illustration of the frame-laminate assembly placed inside a pre-heating oven for heating the thermoplastic laminate;

FIG. 15 is a schematic illustration of the frame-laminate assembly placed inside a press-forming machine;

FIG. 16 is a schematic illustration of the press-forming machine of FIG. 15 during the application of compaction pressure to urge the wrinkle-forming element of FIG. 8 into the thermoplastic laminate;

FIG. 17 is a magnified view of the portion of the frame-laminate assembly and the press-forming machine of FIG. 16, and illustrating the initial application of compaction pressure on the wrinkle-forming element of FIG. 8 against the thermoplastic laminate;

FIG. 18 shows the press-forming machine after urging the wrinkle-forming element of FIG. 8 into the thermoplastic laminate, thereby forming a wrinkle;

FIG. 19 shows the thermoplastic laminate after removal of the wrinkle-forming element, and illustrating the wrinkle geometry of the wrinkle produced by the wrinkle-forming element of FIG. 8;

FIG. 21 shows an example of the tow strip of FIG. 10, positioned on top of the thermoplastic laminate inside the press-forming machine;

FIG. 22 shows the press-forming machine of FIG. 21 after urging the tow strip of FIG. 10 into the thermoplastic laminate;

FIG. 23 shows the thermoplastic laminate after removal of the tow strip of FIG. 10;

FIG. 25 shows the combination straight wire and tow strip of FIG. 11, positioned on top of the thermoplastic laminate inside the press-forming machine;

FIG. 26 shows the press-forming machine after urging the straight wire and tow strip of FIG. 11 into the thermoplastic laminate;

FIG. 27 shows the thermoplastic laminate after removal of the straight wire and tow strip of FIG. 11;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different examples or versions may be provided and should not be construed as limited to the examples or versions set forth herein. Rather, these examples or versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "some examples," "one example," or "an example" Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
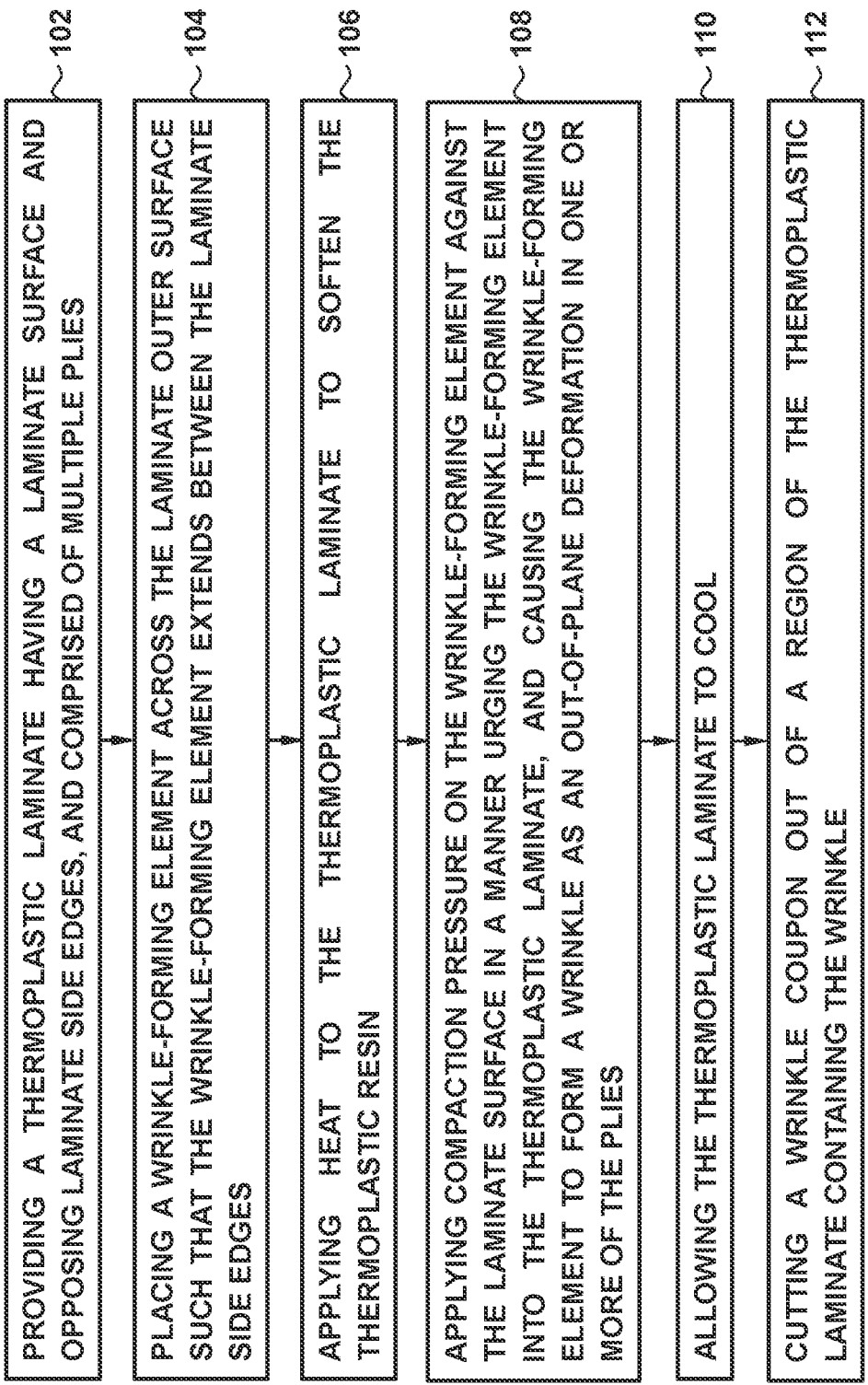
FIG. 1 is a flowchart of operations included in a method of manufacturing a wrinkle coupon.
Figure 2:
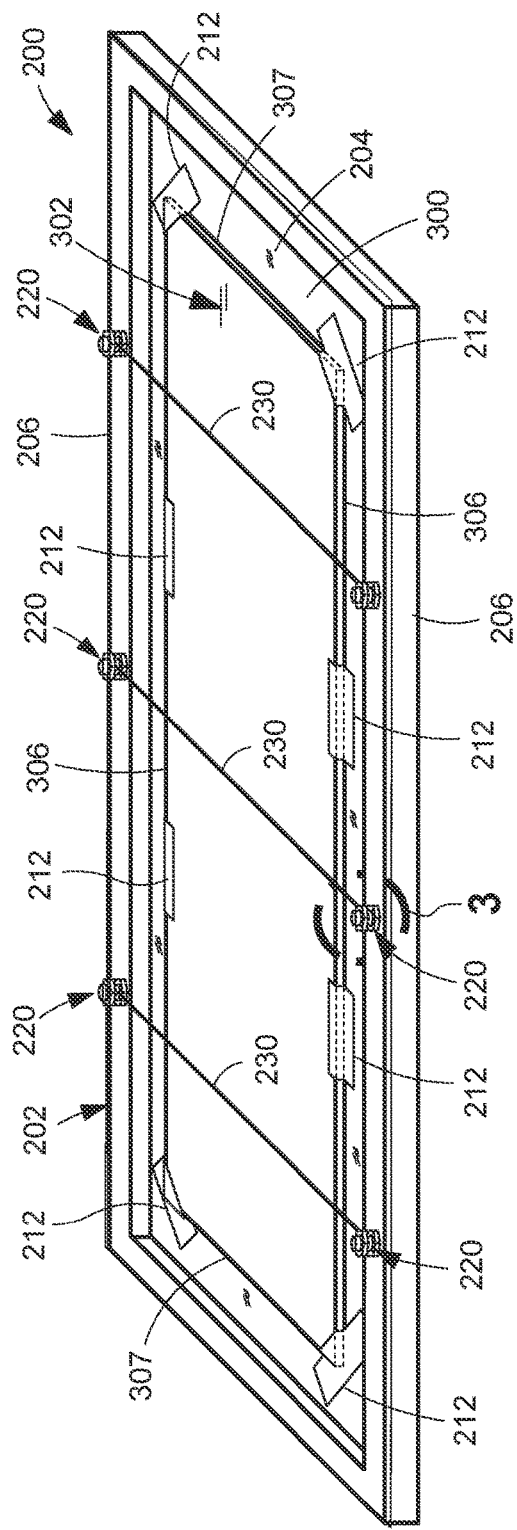
FIG. 2 is a perspective view of an example of a frame-laminate assembly, comprising a laminate support frame for manufacturing one or more wrinkle coupons from a thermoplastic laminate, using one or more wrinkle-forming elements, each extending across the laminate surface between opposing laminate side edges, and secured to frame side members of the laminate support frame.
Figure 4:
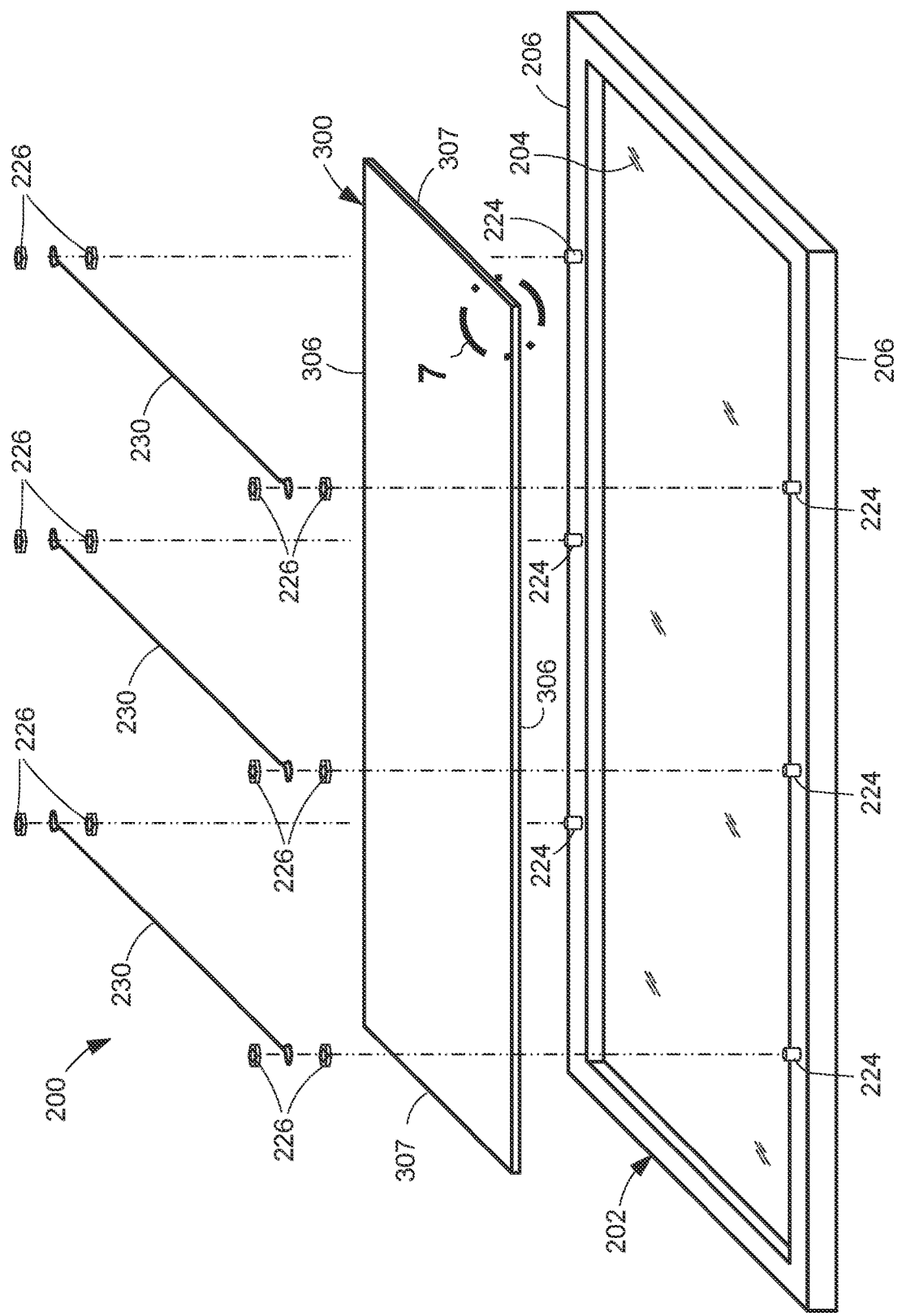
FIG. 4 is an exploded view of the frame-laminate assembly of FIG. 3.
Figure 20:
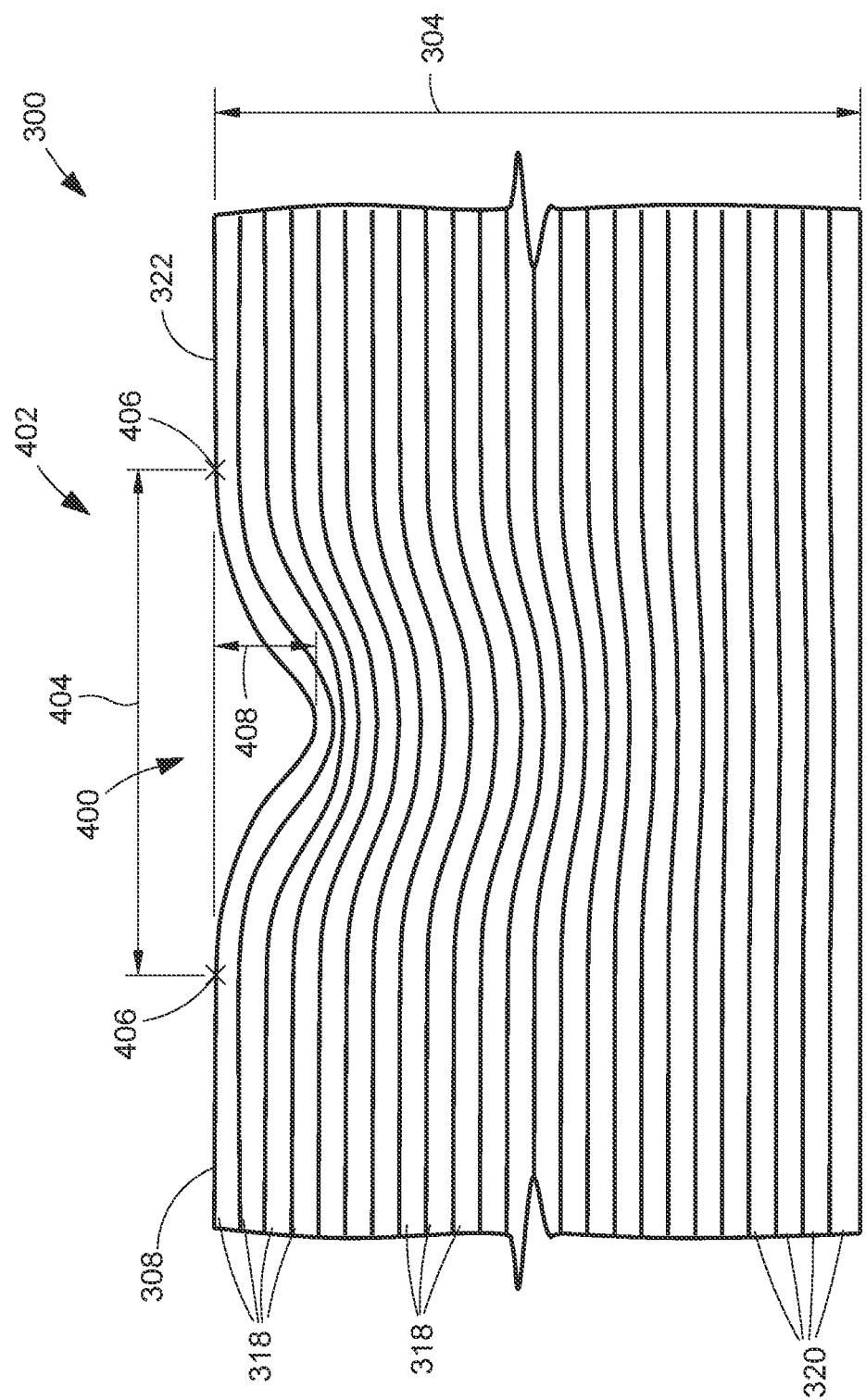
FIG. 20 shows the wrinkle length and the wrinkle depth of the wrinkle geometry produced by the wrinkle-forming element of FIG. 8.

Referring now to the drawings, which illustrate various examples of the disclosure, shown in FIG. 1 are steps included in a method 100 of manufacturing one or more wrinkle coupons 500 (FIG. 30) from a thermoplastic laminate 300 (FIG. 2). The wrinkle coupons 500 are generally planar or flat, to allow for mechanical testing in a testing machine 610 (FIG. 31). When viewed in cross-section, each wrinkle coupon 500 has a wrinkle 400 (FIG. 30) that has a predetermined or predefined wrinkle geometry 402 (FIG. 20). In the present disclosure, a wrinkle 400 is described as a localized out-of-plane deformation in the cross-sectional shape of one or more plies 308 of a thermoplastic laminate 300. As described in greater detail below, the wrinkle geometry 402 of a in a wrinkled ply 318 is defined by the wrinkle length 404 (e.g., FIG. 20) and the wrinkle depth 408 (e.g., FIG. 20) of the wrinkle 400. Through mechanical testing in a testing machine 610 (FIG. 31), wrinkle coupons 500 provide a means to characterize the effect of wrinkle geometries 402 on the mechanical properties (e.g., strength, stiffness, etc.) of a thermoplastic laminate 300.

As described in greater detail below, the method 100 can be implemented for producing a set of wrinkle coupons 500 (FIG. 30) from a thermoplastic laminate 300 (FIG. 2) having a given laminate configuration. In a set of wrinkle coupons 500, each wrinkle coupon 500 has a predefined wrinkle geometry 402 (FIG. 20) that is different than the wrinkle geometry 402 of other wrinkle coupons 500 in the set. The different wrinkle geometries 402 in the set are intended to duplicate the wrinkle geometries 402 that occur in a thermoplastic laminate 300 during manufacturing. By measuring the strength capability of each wrinkle coupon 500 in the set, and comparing the strength capability of the wrinkle coupons 500 to the strength capability of non-wrinkled coupons (not shown) that are devoid of wrinkles, a knockdown factor can be calculated for each wrinkle geometry 402. The knockdown factor associated with a wrinkle geometry 402 represents a reduction in the strength of a thermoplastic laminate 300 containing a wrinkle 400 of the same wrinkle geometry 402 as in the wrinkle coupon 500. The knockdown factor may be included in the evaluation of a thermoplastic part (not shown) known to contain a wrinkle 400, to aid in dispositioning the thermoplastic part without the need to perform a detailed and time-consuming strength analysis on the thermoplastic part.

Figure 7:
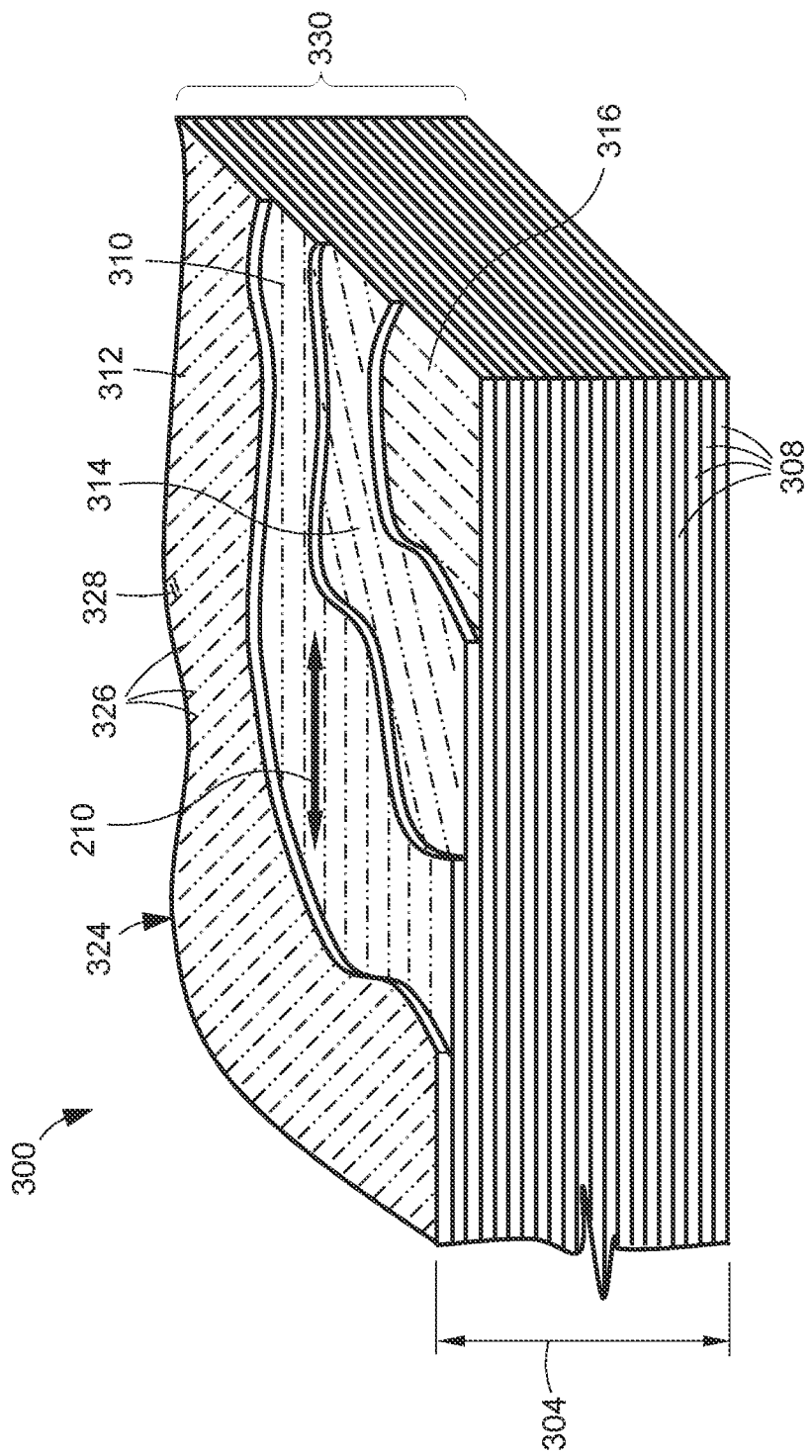
FIG. 7 is a magnified view of the portion of the thermoplastic laminate identified by reference numeral 7 of FIG. 4, and illustrating the composite plies that make up the thermoplastic laminate.

Referring to FIGS. 1-7, step 102 of the method 100 includes providing a thermoplastic laminate 300. As shown in FIGS. 2-7, the thermoplastic laminate 300 is planar or flat, and is comprised of multiple plies 308. In the example of FIG. 7, the thermoplastic laminate 300 has twenty plies 308. However, the thermoplastic laminate 300 may include any number of plies 308, which collectively define the laminate thickness 304 (FIG. 7). The plies 308 of the thermoplastic laminate 300 are comprised of thermoplastic prepreg material 324 (FIG. 7). Each ply 308 is relatively thin, ranging in thickness from 0.005 to 0.012 inch or more. Each ply 308 is comprised of reinforcing fibers 326 (FIG. 7) pre-impregnated with thermoplastic resin 328 (FIG. 7). The reinforcing fibers 326 may be formed of carbon, glass, and/or any other fiber material. The thermoplastic resin 328 may be any suitable thermoplastic material, such as poly-ether-ketone-ketone (PEKK), or other thermoplastic material. In the example shown, the reinforcing fibers 326 in each ply 308 are continuous fibers that are commonly aligned in a single direction (e.g., unidirectional fibers). However in other laminate configurations not shown, the reinforcing fibers 326 in one or more of the plies 308 may be woven fibers (e.g., woven fabric), short chopped fibers, braided fibers (e.g., braided fabric), or other fiber arrangements.

In FIG. 7, the thermoplastic laminate 300 has a quasi-isotropic layup, and has 0/±45/90 ply orientations, including 0-degree plies 310, +45-degree plies 312, −45-degree plies 314, and 90-degree plies 316. However, the method 100 may be implemented using a thermoplastic laminate 300 having ply orientations other than, or in addition to, the above-noted (0/±45/90) ply orientations. For example, a thermoplastic laminate 300 may have ply orientations of (0/90), (0/90/30/−60), (0/90/45/−45), (30/−60/60/−30), or any one of a variety of other ply orientations. The plies 308 are arranged in a ply stacking sequence 330, which defines the ply orientation of each ply 308 from bottom to top in the thermoplastic laminate 300. The thermoplastic laminate 300 has a laminate configuration, which is comprised of at least the following: the type of thermoplastic prepreg material 324, and the ply stacking sequence 330. The thermoplastic laminate 300 may be pre-consolidated prior to forming wrinkles 400 in the thermoplastic laminate 300 in the presently-disclosed method.

In FIG. 5, the thermoplastic laminate 300 has a generally rectangular shape having a laminate width extending between a pair of laminate side edges 306, and having a laminate length extending between a pair of laminate end edges 307. In the example shown, the laminate width is approximately 12 inches, and the laminate length is approximately 30 inches, providing 11 inches by 29 inches of usable material from which wrinkle coupons 500 of 1.5 inch by 12 inch can be cut. However, the thermoplastic laminate 300 may be provided in any size and in any shape, including a square shape (not shown).

Referring to FIGS. 2-6, shown is an example of a laminate support frame 202 for supporting the thermoplastic laminate 300. Collectively, the thermoplastic laminate 300 and the support frame comprise a frame-laminate assembly 200. The laminate support frame 202 has a frame panel 204 configured to support the thermoplastic laminate 300. In the example shown, the thermoplastic laminate 300 is secured to the frame panel 204 using adhesive tape 212 (e.g., mylar tape) at one or more locations along the laminate side edges 306, along the laminate end edges 307, and/or at the corners of the thermoplastic laminate 300, as shown in FIG. 5. Alternatively or additionally, the thermoplastic laminate 300 may be secured to the frame panel 204 by mechanical means, such as via one or more mechanical clamping mechanisms (not shown).

The frame panel 204 extends between opposing frame side members 206, and opposing frame end members 208. In the example shown, the laminate support frame 202 is sized to provide space between each laminate side edge 306 and the adjacent frame side member 206, and space between each laminate end edge 307 and adjacent frame end member 208. The laminate support frame 202 may be constructed of metallic material, or any other material capable of withstanding the heat 602 (FIG. 14) applied to the thermoplastic laminate 300 by the pre-heating oven 600 (FIG. 14), as described below.

In FIGS. 2-6, the frame-laminate assembly 200 includes three wrinkle-forming elements 230, each extending across the laminate surface 302 between the laminate side edges 306. Although three wrinkle-forming elements 230 are shown, a frame-laminate assembly 200 may include any number of wrinkle-forming elements 230. As described in greater detail below, each wrinkle-forming element 230 is pressed into the laminate surface 302 of the thermoplastic laminate 300, to thereby form a wrinkle 400 (FIG. 20) in one or more plies 308 (FIG. 20) of the thermoplastic laminate 300. Each wrinkle-forming element 230 is provided in a specific wrinkle-forming-element configuration 232 (FIGS. 8-13), to thereby form a wrinkle 400 having a predetermined wrinkle geometry 402 (FIG. 20).

In the example shown, the frame-laminate assembly 200 includes a pair of wrinkle-forming-element attachment mechanisms 220 for each wrinkle-forming element 230. Each wrinkle-forming-element attachment mechanism 220 is configured to secure one end of the wrinkle-forming element 230 to the frame side member 206 of the laminate support frame 202. In this regard, each wrinkle-forming element 230 is secured to the laminate support frame 202 by a pair of wrinkle-forming-element attachment mechanisms 220. The pair of wrinkle-forming-element attachment mechanisms 220 are configured to support the wrinkle-forming element 230 slightly above or in contact with the laminate surface 302, while allowing the compaction pressure 608 (FIGS. 16-17) to force the wrinkle-forming element 230 into the thermoplastic laminate 300 via the below-described press-forming machine 604 (FIGS. 15-16).

Figure 3:
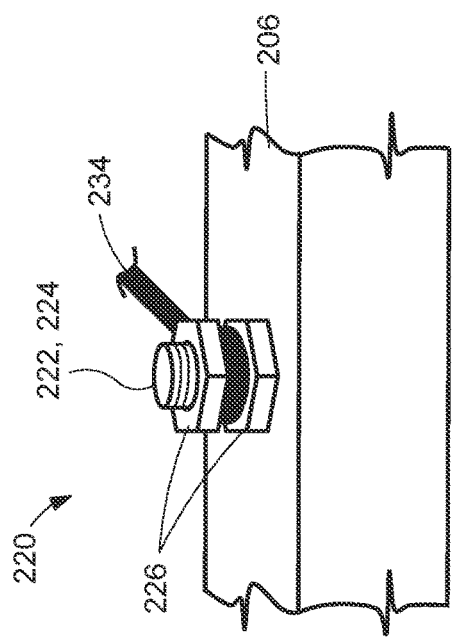
FIG. 3 is a magnified view of the portion of the laminate support frame of FIG. 2, and illustrating an example of a wrinkle-forming-element attachment mechanism, configured to attach one end of a wrinkle-forming element to one of the frame side members.

In the example shown, each wrinkle-forming-element attachment mechanism 220 is configured as a post 222 (FIG. 3), protruding upwardly from the frame side member 206. Each post 222 may be a threaded shaft 224 (FIG. 3) configured to receive a pair of threaded nuts 226 (FIG. 3). The end of the wrinkle-forming element 230 may be clamped between the pair of nuts after the wrinkle-forming element has been tensioned. Each pair of wrinkle-forming-element attachment mechanisms 220 is configured to maintain the wrinkle-forming element 230 in tension over the laminate surface 302. Tension in the wrinkle-forming element 230 is maintained at a level such that, during the below-described heating and cool down of the thermoplastic laminate 300, the wrinkle-forming element 230 remains straight, thereby avoiding thermally-induced bowing of the wrinkle-forming element 230, which would otherwise cause the resulting wrinkle 400 to be non-straight.

Referring to FIGS. 5 and 7, the thermoplastic laminate 300 includes at least one 0-degree ply 310 (FIG. 7), in which the reinforcing fibers 326 define a zero-degree direction 210 of the thermoplastic laminate 300, and which is parallel to the lengthwise direction of the thermoplastic laminate 300. Each pair of wrinkle-forming-element attachment mechanisms 220 are preferably positioned on the frame side members 206 in a manner such that the wrinkle-forming element 230 is perpendicular (e.g., within 20 degrees) to the zero-degree direction 210 of the thermoplastic laminate 300. As described below, wrinkle coupons 500 are cut out of the thermoplastic laminate 300 such that the lengthwise direction of the wrinkle coupon 500 is parallel to the zero-degree direction 210 of the thermoplastic laminate 300. Orienting the wrinkle-forming element 230 in such a manner ensures that the wrinkle 400 in the wrinkle coupon 500 is perpendicular to the direction of the test load 618 (FIG. 31) applied by the testing machine 610 (FIG. 31). However, in other examples not shown, the wrinkle-forming-element attachment mechanisms 220 may be positioned on the frame side members 206 in a manner such that the wrinkle-forming element 230 is non-perpendicular (e.g., parallel) to the zero-degree direction 210 of the thermoplastic laminate 300.

Referring to FIGS. 8-13, shown are several non-limiting examples of wrinkle-forming-element configurations 232 that may be implemented for forming wrinkles 400 (FIGS. 20, 24, and 28) of a predefined wrinkle geometry 402 in the thermoplastic laminate 300. For example, FIGS. 8-9 show examples of the wrinkle-forming element 230 configured as a wire 234. As shown in FIG. 8, the wire 234 is a straight wire 238 (i.e., a bare wire) which, in the example shown, has a circular-shaped cross section. In the example of FIG. 9, the wire 234 is a helically wound coiled wire 240 covering a straight wire 238. The examples shown in FIGS. 8-9 may be provided as guitar strings 236, or the strings of other types of string instruments. The straight wire 238 may have a circular cross section as shown in the example, or the straight wire 238 may have another cross-sectional shape. Although not shown, the wrinkle-forming element 230 may be a helically wound coiled wire having a hollow core.

Any one of the above-described wire configurations may be formed of metallic material, such as stainless steel, nickel, or other alloys. Alternatively, any one of the wire configurations may be formed of non-metallic material, such as a polymeric material, that is capable of withstanding the temperatures that the thermoplastic laminate 300 is heated to in the pre-heating oven 600 (FIG. 14). Any of the above-described wire configurations may have an outer wire diameter 242 of between 0.005 and 0.060 inch, or larger. For example, the straight wire 238 of FIG. 8 may be provided in a wire diameter 242 of 0.009 inch, 0.012 inch, 0.020 inch diameter, or in other wire diameters 242. In FIG. 9, the coiled wire 240 (covering the straight wire 238) may be provided in a wire diameter 242 of approximately 0.050 inch or more, although the coiled wire 240 may be provided in a wire diameter 242 of less than 0.050 inch.

Referring to FIG. 10, shown is an example of a wrinkle-forming element 230 configured as a tow strip 250. Similar to the wire 234 configuration, the tow strip 250 is configured to form a wrinkle 400 (FIG. 24) of a predefined wrinkle geometry 402 (FIG. 24) in the thermoplastic laminate 300. The tow strip 250 may be described as fiber tape, comprised of a plurality of continuous unidirectional reinforcing filaments (not shown) pre-impregnated with thermoplastic resin 328. In some examples, the tow strip 250 may be comprised of the same thermoplastic prepreg material 324 as the plies 308 (FIG. 7) that make up the thermoplastic laminate 300. Alternatively, the filaments and/or the thermoplastic resin 328 in the tow strip 250 may be formed of a different material than the fiber and/or the thermoplastic resin 328 of the thermoplastic prepreg material 324. The tow strip 250 may be relatively thin, having a strip thickness 252 of less than 0.030 inch, and a strip width 254 of less than approximately 1.0 inch. For example, the tow strip 250 may have a strip thickness 252 of from 0.005 to 0.012 inch, and/or a strip width 254 of from 0.040 to 0.10 inch. As described in greater detail below, a wrinkle-forming-element configuration 232 comprised exclusively of one or more tow strips 250 (i.e., no wires 234) may be used to form wrinkles 400 having a larger length-to-depth ratio (i.e., wrinkle length 404 divided by wrinkle depth 408) than wrinkles 400 formed solely by a wire 234.

Referring to FIGS. 11-13, shown is an example of a wrinkle-forming-element provided as a wire 234, and one or more tow strips 250 placed over the wire 234. In the example shown, the tow strips 250 are approximately centered over the wire 234. FIG. 11 shows an example of a single tow strip 250 placed over a straight wire 238. The wire 234 in FIG. 11 has a wire diameter 242 of approximately 0.012 inch, and the tow strip 250 has a strip thickness 252 of approximately 0.005 inch and a strip width 254 of approximately 0.050 inch. FIG. 12 shows an example of a single tow strip 250 covering a coiled wire 240. FIG. 13 shows an example of two tow strips 250 covering a straight wire 238. The combination of the wire 234 and one or more tow strips 250 results in wrinkles 400 that have a larger length-to-depth ratio than wrinkles 400 formed solely by a wire 234. In any one of the above-described wrinkle-forming element configurations 232, the wrinkle-forming-element attachment mechanisms 220 (FIG. 3) are configured to maintain the wire(s) 234 and/or the tow strip(s) 250 in tension while being pressed into the thermoplastic laminate 300 by the below-described press-forming machine 604 (FIGS. 15-16).

Referring again to the flowchart of FIG. 1, the method 100 includes supporting the thermoplastic laminate 300 (FIG. 2) on the laminate support frame 202 (FIG. 2). As described above, the laminate support frame 202 is sized and shaped complementary to the thermoplastic laminate 300, and includes the frame panel 204 (FIG. 2) upon which the thermoplastic laminate 300 is supported. The method includes securing the thermoplastic laminate 300 to the frame panel 204 to prevent movement of the thermoplastic laminate 300 when the wrinkle-forming elements 230 (FIG. 2) are pressed into the laminate surface 302 using the press-forming machine 604 (FIGS. 15-16). In the example of FIG. 2 described above, the thermoplastic laminate 300 may be secured to the frame panel 204 using heat-resistant adhesive tape 212. Alternatively, the thermoplastic laminate 300 may be secured to the frame panel 204 using mechanical means (e.g., clamps—not shown).

Step 104 of the method 100 includes placing each wrinkle-forming element 230 (FIG. 5) in a straight line across the laminate surface 302 (FIG. 5), such that each wrinkle-forming element 230 extends at least between the laminate side edges 306 (FIG. 5). As mentioned above and shown in FIG. 7, the thermoplastic laminate 300 includes at least one ply 308 in which the reinforcing fibers 326 define the zero-degree direction 210 (i.e., parallel to the laminate length) of the thermoplastic laminate 300. For such laminate configurations, step 104 further includes placing the wrinkle-forming element 230 across the laminate surface 302 such that each wrinkle-forming element 230 is approximately perpendicular (e.g., within 10 degrees) to the zero-degree direction 210 of the thermoplastic laminate 300. As mentioned above, orienting the wrinkle-forming element 230 perpendicular to the zero-degree direction 210 ensures that the wrinkle 400 in each wrinkle coupon 500 (FIG. 30) is perpendicular to the direction of the test load 618 (FIG. 31) applied by the testing machine 610 (FIG. 31).

The example of FIG. 5 shows three wrinkle-forming elements 230 placed across the laminate surface 302, and which are spaced equidistantly apart from each other. However, any number of wrinkle-forming elements 230 may be used with the laminate support frame 202. In one example, the wrinkle-forming elements 230 may all have the same wrinkle-forming-element configuration 232, so that the wrinkle-forming elements 230 form wrinkles 400 of the same wrinkle geometry 402 in the thermoplastic laminate 300. Alternatively, each wrinkle-forming element 230 may have a different wrinkle-forming-element configuration 232, so that each wrinkle-forming element 230 forms a different wrinkle geometry 402 than the wrinkle geometry 402 formed by the other wrinkle-forming elements 230. In FIG. 5, each wrinkle-forming element 230 is positioned at the approximate midpoint of the wrinkle coupons 500 that will ultimately be cut from the thermoplastic laminate 300. The thermoplastic laminate 300 has a laminate width that allows for multiple side-by-side wrinkle coupons 500 to be cut from the thermoplastic laminate 300.

As mentioned above, step 104 of placing the wrinkle-forming element 230 (FIG. 5) across the laminate surface 302 (FIG. 5) comprises, placing a wire 234 across the laminate surface 302. FIGS. 8-9, described above, show two examples of the wire 234, including a straight wire 238 (FIG. 8), or a helically wound coiled wire 240 surrounding a straight wire 238 (FIG. 9). As mentioned above, the wires 234 are selected based on the wire diameter 242 to produce the desired wrinkle geometry 402 in the thermoplastic laminate 300. In some examples, the step of placing a wire 234 across the laminate surface 302 involves placing a guitar string 236 across the laminate surface 302. Advantageously, in their normal usage, guitar strings 236 are configured to be placed in tension, and are available in materials such as steel and/or nickel that are capable of withstanding the temperatures that the thermoplastic laminate 300 is subjected to when placed in the pre-heating oven 600. As an alternative to a wire 234, step 104 comprises placing at least one tow strip 250 (FIG. 10) across the laminate surface 302. In a still further example, step 104 comprises placing a wire 234 across the laminate surface 302, and placing at least one tow strip 250 over the wire 234. As mentioned above, the combination of the wire 234 will one or more tow strips 250 results in a wrinkle 400 having a larger length-to-width ratio than a wrinkle 400 formed using a wire 234 without a tow strip 250.

Referring to FIGS. 2-5, step 104 includes using a pair of wrinkle-forming-element attachment mechanisms 220 to secure opposing ends of each wrinkle-forming element 230 to the frame side members 206 of the laminate support frame 202. In the example shown, this step includes securing each end of each wrinkle-forming element 230 to a post 222, such as by looping each end of the wrinkle-forming element 230 around a threaded shaft 224 protruding upwardly from the frame side member 206. The looped end of the wrinkle-forming element 230 can then be clamped between a pair of nuts 226 mounted on the threaded shaft 224. However, as may be appreciated, each end of a wrinkle-forming element 230 can be attached to the frame side member 206 using any one of a variety of different attachment mechanisms, and is not limited to looping each end of each wrinkle-forming element 230 around a threaded shaft 224 and clamping with a pair of nuts 226. Regardless of the specific configuration, each pair of wrinkle-forming-element attachment mechanisms 220 is configured to support the wrinkle-forming element 230 slightly above or in direct contact with the laminate surface 302, while also allowing compaction pressure 608 from the press-forming machine 604 to urge the wrinkle-forming element 230 across the entire laminate width of the thermoplastic laminate 300, as described below.

As mentioned above, the method 100 includes maintaining each wrinkle-forming element 230 in tension while applying compaction pressure 608 on the wrinkle-forming element 230 against the thermoplastic laminate 300. Tension is applied to the wrinkle-forming element 230 by an amount such that, during heating and cool down of the thermoplastic laminate 300, the wrinkle-forming element 230 remains straight, thereby avoiding thermally-induced bowing of the wrinkle-forming element 230 caused by differences in the coefficient of thermal expansion (CTE) of the wrinkle-forming element 230 relative to the CTE of the thermoplastic laminate 300, and which would otherwise cause the resulting wrinkle 400 to be non-straight. In the example of FIGS. 2-5, tension can be applied to the wrinkle-forming element 230 while the looped end of the wrinkle-forming element 230 is clamped between the upper and lower nuts 226 mounted on the threaded shaft 224. As mentioned above, the ends of the wrinkle-forming element 230 can be clamped to the frame side members 206 using any means, and are not limited to the wrinkle-forming-element attachment mechanisms 220 shown in FIGS. 2-5. In a still further example not shown, the ends of a wrinkle-forming element 230 can be taped to the laminate side edges 306.

Referring to FIG. 14, step 106 of the method 100 includes applying heat 602 to the thermoplastic laminate 300, such as via a pre-heating oven 600. Heat is applied to the frame-laminate assembly 200 to elevate the temperature of the thermoplastic resin 328 (FIG. 7) by an amount causing a reduction in the viscosity of the thermoplastic resin 328, during which the thermoplastic resin 328 transitions from a hardened state at room temperature, to a softened state at elevated temperatures. In one example, the pre-heating oven 600 includes infrared lamps located above and below the frame-laminate assembly 200. Alternatively or additionally, the pre-heating oven 600 may apply heat 602 to the frame-laminate assembly 200 via convective heating and/or conductive heating. Regardless of configuration, the pre-heating oven 600 heats the thermoplastic laminate 300 to at least the glass transition temperature if the thermoplastic resin 328 is amorphous, or to at least to the melting temperature if the thermoplastic resin 328 is a semi-crystalline material. If the wrinkle-forming elements 230 include one or more tow strips 250, the pre-heating machine also heats the tow strips 250 to either the glass transition temperature or the melting temperature, depending on whether the thermoplastic resin 328 in the tow strips 250 is amorphous or semi-crystalline.

Referring to FIGS. 15-18, step 108 of the method 100 includes applying compaction pressure 608 on the wrinkle-forming element 230 against the laminate surface 302 in a manner urging the wrinkle-forming element 230 into the thermoplastic laminate 300. FIG. 15 shows the frame-laminate assembly 200 placed in the press-forming machine 604 after being heated in the pre-heating oven 600. Although not shown, a shuttle system may be used to automatically shuttle the frame-laminate assembly 200 from the pre-heating oven 600 to the press-forming machine 604. The press-forming machine 604 has an upper press plate 602 and a lower press plate 602 that collectively apply compaction pressure 608 to the thermoplastic laminate 300. One or both of the press plates 602 may be formed of metallic material. Alternatively, one or both of the press plates 602 may include an elastomeric material, which may more uniformly distribute compaction pressure 608 over the thermoplastic laminate 300 when pressing the wrinkle-forming element 230 into the thermoplastic laminate 300.

As shown in FIGS. 17-18, compaction pressure 608 is applied by the press-forming machine 604 while thermoplastic laminate 300 is at an elevated temperature, and is therefore soft and conformable. Compaction pressure 608 is applied until the uppermost portion of the wrinkle-forming elements 230 are flush (e.g., within approximately 0.002 inch) with the laminate surface 302, causing each wrinkle-forming element 230 to form a wrinkle 400 in the thermoplastic laminate 300 as an out-of-plane deformation in one or more of the plies 308.

Step 110 of the method 100 includes allowing the thermoplastic laminate 300 to cool after the wrinkle-forming elements 230 have been pressed into the thermoplastic laminate 300. As the thermoplastic laminate 300 cools down, the thermoplastic resin 328 (FIG. 7) transitions from a softened state at the previously-elevated temperature, back down to a hardened state at room temperature (e.g., 68 degrees F.). Compaction pressure 608 may be maintained on the frame-laminate assembly 200 while cooling, to avoid potential springback that may otherwise occur in the winkled plies 308 if the compaction pressure 608 was released prior to the thermoplastic resin 328 returning to the hardened state. FIG. 19 shows the resulting wrinkle 400 in the thermoplastic laminate 300 after removal from the press-forming machine 604.

Referring to FIG. 20, shown is a cross section of a portion of the thermoplastic laminate 300 of FIGS. 14-19 containing a wrinkle 400 that has been formed by a straight wire 238 (FIGS. 17-18) as the wrinkle-forming element 230. The thermoplastic laminate 300 includes wrinkled plies 318 and non-wrinkled plies 320. As mentioned above, each wrinkled ply 318 has a localized out-of-plane deformation in its cross-sectional shape at the location of the wrinkle 400. The non-wrinkled plies 320 are devoid of localized out-of-plane deformations.

The wrinkle 400 in each wrinkled ply 318 has a wrinkle geometry 402, defined by the wrinkle length 404 and the wrinkle depth 408 of the wrinkle 400. In one example, the wrinkle geometry 402 can be determined by generating a cross-sectional image of the wrinkle coupon 500 (FIG. 30) after cutting out of the thermoplastic laminate 300, and measuring the wrinkle length 404 and the wrinkle depth 408 of at least one wrinkled ply 318 of the wrinkle coupon 500. The wrinkle length 404 is the distance between the tangent points 406 of the ply surface 322 on opposite sides of the wrinkle 400. The tangent point 406 on each side of the wrinkle 400 is the location where the out-of plane deformation of the wrinkled ply 318 starts. The wrinkle depth 408 is the maximum distance of the out-of-plane deformation, measured locally perpendicular to where the ply surface 322 would be if non-wrinkled. The wrinkle geometry 402 in FIG. 20 is an example of one type of wrinkle geometry 402 that can occur or which has occurred in a thermoplastic laminate 300 during manufacturing.

FIGS. 21-24 show a cross section of a portion of a thermoplastic laminate 300 at the location of a wrinkle-forming element 230 configured as a tow strip 250, similar to the arrangement shown in FIG. 10. FIG. 21 shows the tow strip 250 positioned on top of the thermoplastic laminate 300 while placed inside the press-forming machine 604. FIG. 22 shows the application of compaction pressure 608, urging the tow strip 250 into the thermoplastic laminate 300. The thermoplastic resin 328 in the tow strip 250 is softened by the pre-heating oven 600 (FIG. 14), which allows the opposing side edges of the tow strip 250 to be compressed into a tapered cross-sectional shape by the press-forming machine 604, and increasing the length-to-depth ratio of the resulting wrinkle 400. FIG. 23 shows the thermoplastic laminate 300 after cool down, and after removal of the tow strip 250.

Figure 24:
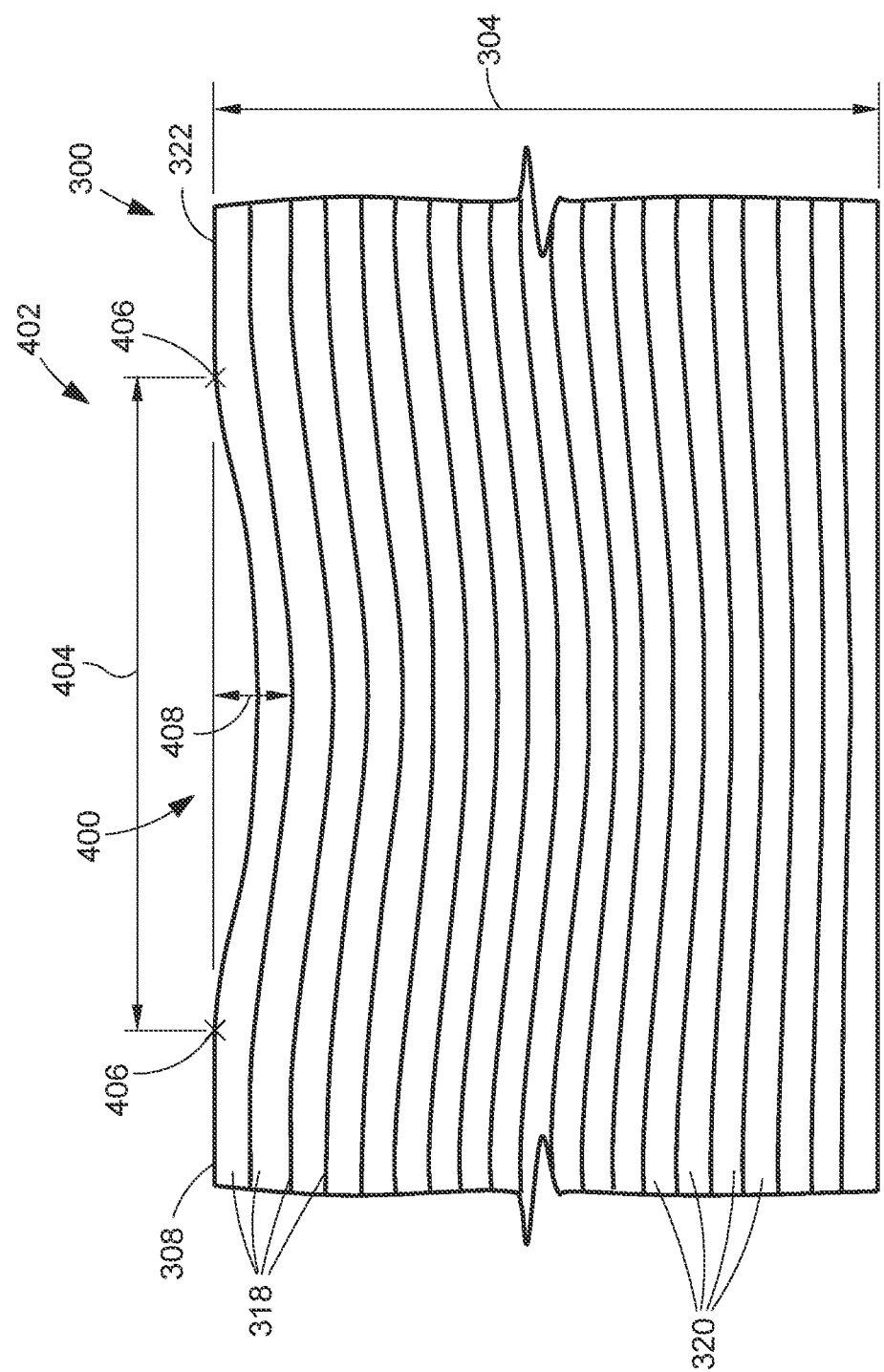
FIG. 24 shows the wrinkle length and the wrinkle depth of the wrinkle geometry produced by the tow strip of FIG. 10.

As shown in FIG. 24, the wrinkle geometry 402 produced by the tow strip 250 of FIG. 21 has a larger length-to-depth ratio than the wrinkle geometry 402 in FIG. 20 resulting from the wire 234 in FIGS. 17-18. In addition, the wrinkle geometry 402 produced by the tow strip 250 of FIG. 21 has a smaller depth-to-thickness ratio than the wrinkle geometry 402 in FIG. 20 produced by the wire 234 of FIGS. 17-18.

In the present disclosure, the length-to-depth ratio of a wrinkle 400 is the ratio of the wrinkle length 404 to the wrinkle depth 408. The length-to-depth ratio of a wrinkle 400 represents the sharpness of the wrinkle 400 or the tightness of the radii of curvature in the cross-sectional shape of the wrinkle 400 in a wrinkled ply 318. The depth-to-thickness ratio is the ratio of the wrinkle depth 408 to the laminate thickness 304 (e.g., either nominal laminate thickness or actual laminate thickness). The depth-to-thickness ratio represents the penetration of the wrinkle 400 into the thermoplastic laminate 300, relative to the laminate thickness 304. In general, a relatively large length-to-depth ratio may be less detrimental to the strength capability of a thermoplastic laminate 300 than a small length-to-depth ratio, due in part to the greater length over which loads in the reinforcing fibers 326 can be transferred to adjacent reinforcing fibers 326 in a wrinkle 400 of relatively large length-to-depth ratio. Similarly, a relatively small depth-to-thickness ratio may be less detrimental to the strength capability of a thermoplastic laminate 300 than a large depth-to-thickness ratio, due in part to a larger quantity of non-wrinkled plies 320 that can share in carrying the structural loads on the thermoplastic laminate 300.

FIGS. 25-28 show a cross section of a portion of a thermoplastic laminate 300 at the location of a wrinkle-forming element 230 configured as a combination wire 234 and tow strip 250, similar to the arrangement shown in FIG. 11. FIG. 25 shows the wire 234 and tow strip 250 positioned on top of the thermoplastic laminate 300 while inside the press-forming machine 604. FIG. 26 shows the application of compaction pressure 608, urging the wire 234 and tow strip 250 into the thermoplastic laminate 300. As described above for FIG. 22, the thermoplastic resin 328 in the tow strip 250 of FIG. 26 is softened by the pre-heating oven 600 (FIG. 14), which allows the opposing side edges of the tow strip 250 to be compacted by the press-forming machine 604 into a tapered cross-sectional shape. In addition, the softened tow strips 250 fill in the narrow regions on opposite side of the wire 234 at the lowermost portion of the wire 234. FIG. 27 shows the thermoplastic laminate 300 after cool down and removal of the wire 234 and tow strip 250.

Figure 28:
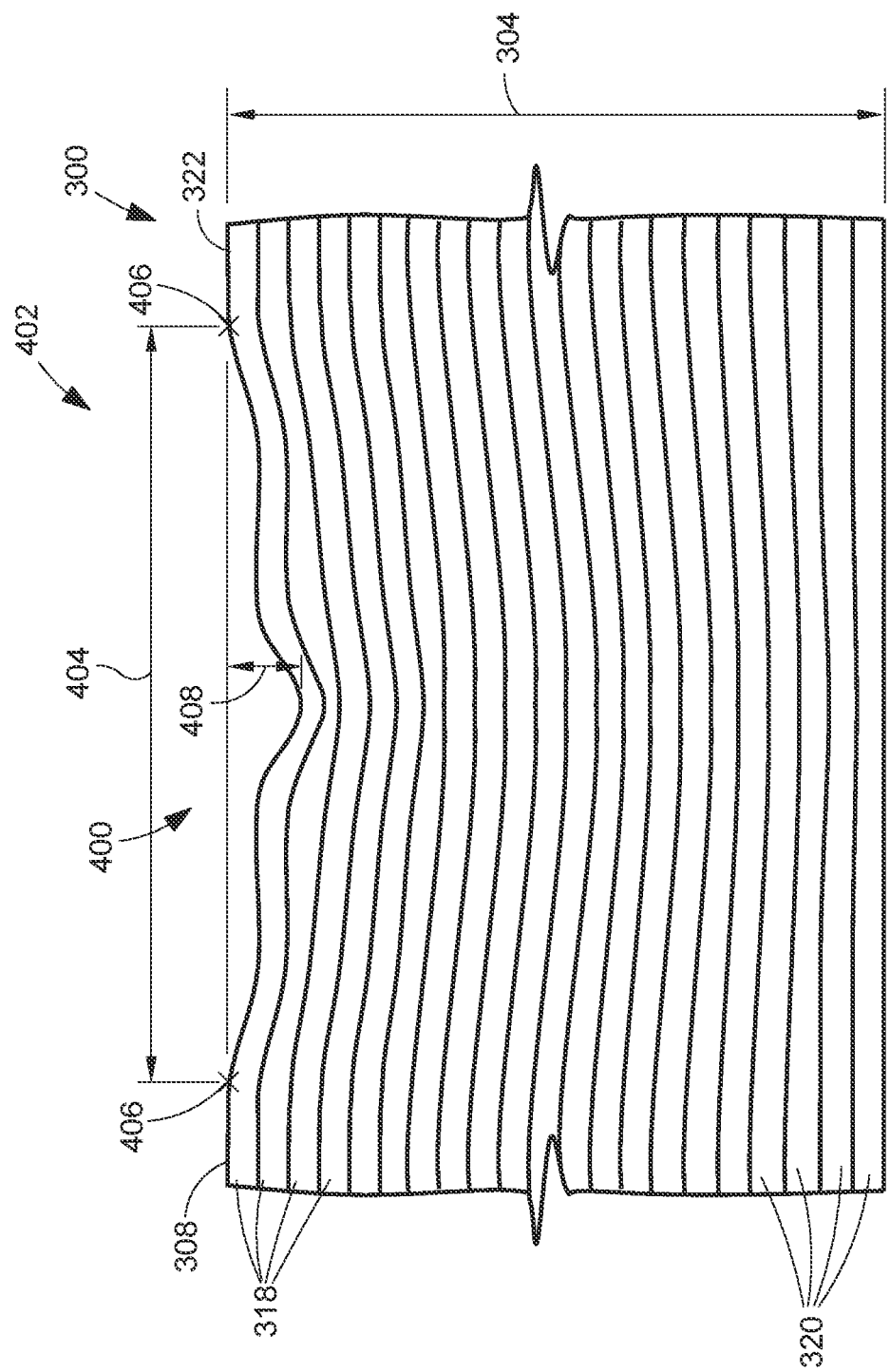
FIG. 28 shows the wrinkle length and the wrinkle depth of the wrinkle geometry produced by the straight wire and tow strip of FIG. 11.

FIG. 28 shows the wrinkle geometry 402 produced by the wire 234 and tow strip 250 of FIG. 25. Due to the large strip width 254 of the tow strip 250 relative to the smaller wire diameter 242, the wrinkle 400 in FIG. 28 has a larger length-to-depth ratio than the length-to-depth ratio in FIG. 24 produced by the tow strip 250 of FIG. 21. In addition, the wrinkle geometry 402 in FIG. 28 has a smaller depth-to-thickness ratio than the wrinkle geometry 402 in FIG. 20. As may be appreciated, any one of a variety of different wrinkle-forming element configurations 232 may be implemented for producing a predetermined wrinkle geometry 402.

Figure 29:
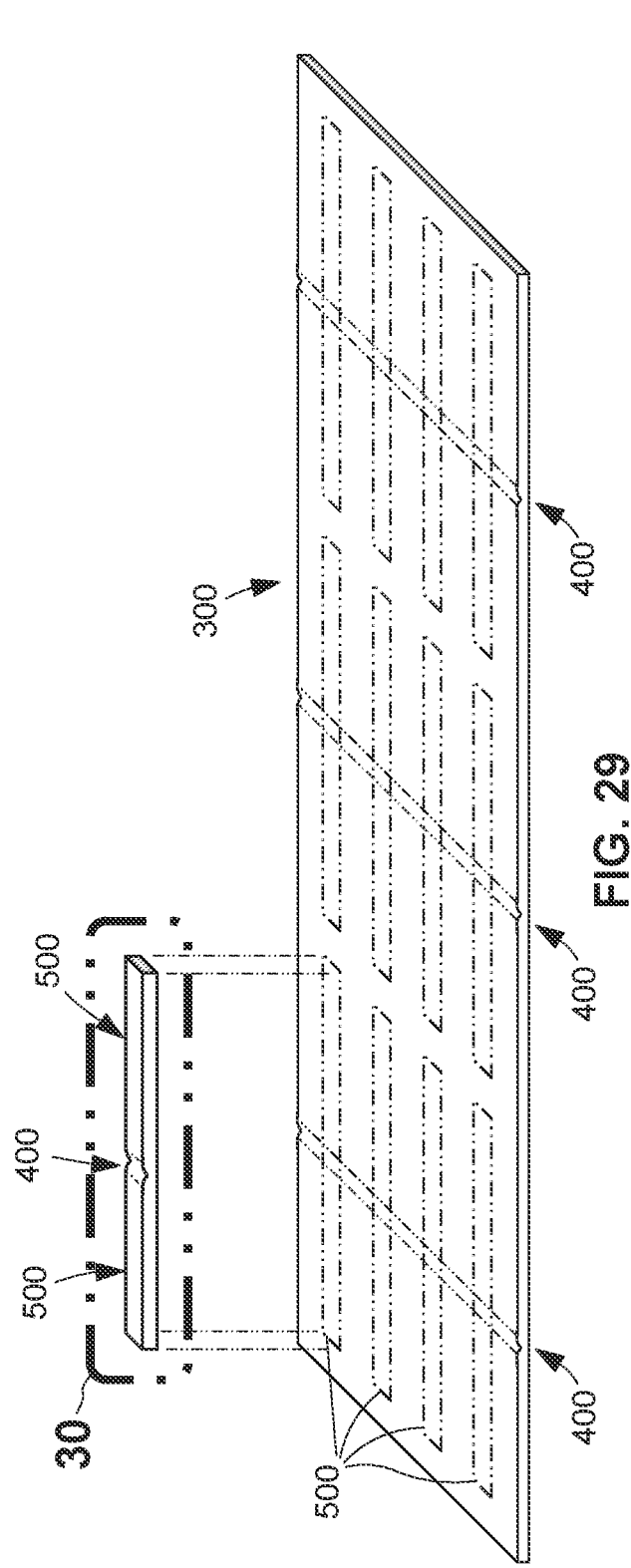
FIG. 29 is a perspective view of an example of a thermoplastic laminate containing wrinkles formed by a plurality of wrinkle-forming elements, and also illustrating an example of a wrinkle coupon after being cut out of the thermoplastic laminate.
Figure 30:
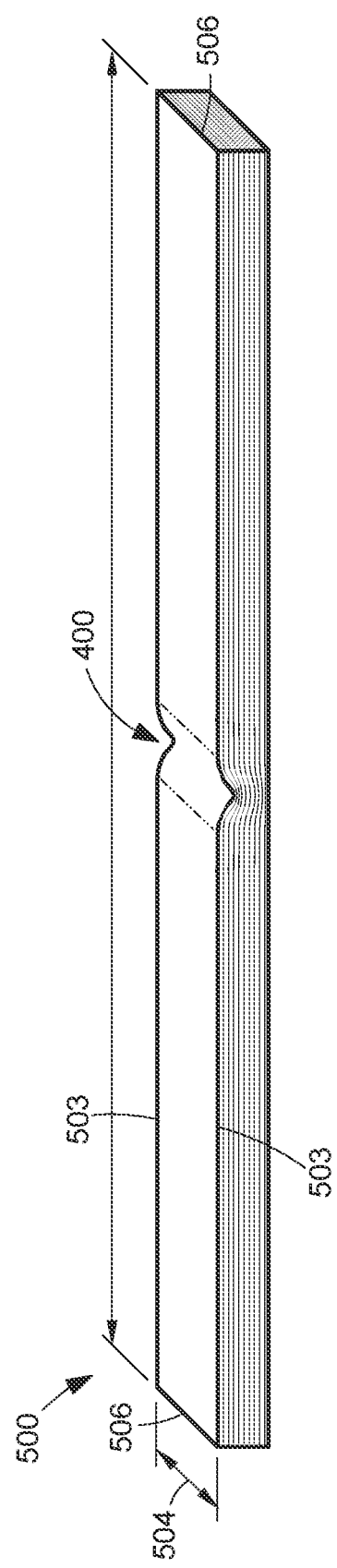
FIG. 30 is a magnified view of the wrinkle coupon of FIG. 29.
Figure 31:
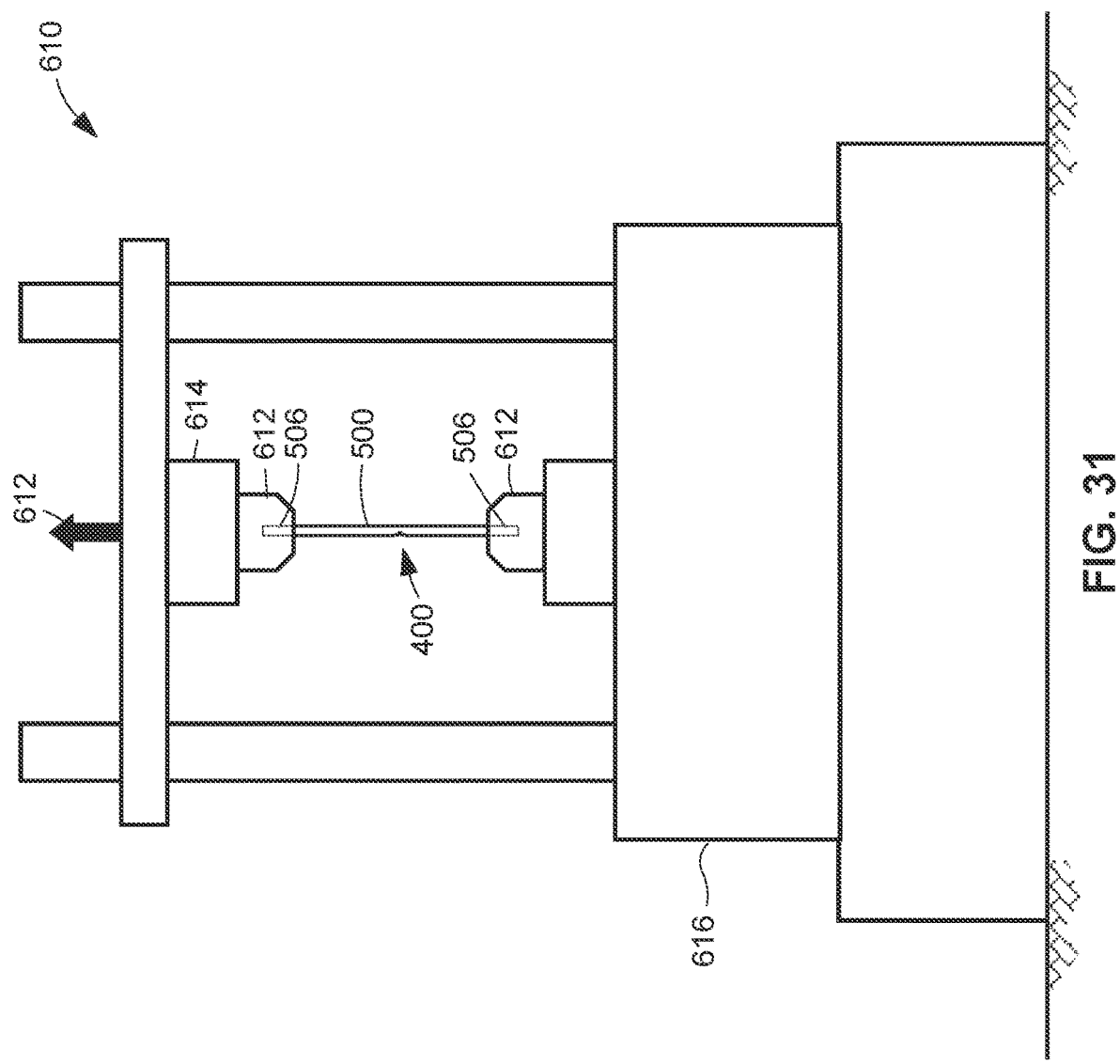
FIG. 31 shows an example of a wrinkle coupon mounted in a testing machine for applying a load to the wrinkle coupon, for determining the strength capability of the wrinkle coupon.

Referring to FIGS. 29-30, step 112 of the method 100 includes cutting one or more wrinkle coupons 500 out of the regions of the thermoplastic laminate 300 containing wrinkles 400. In the example shown, the wrinkles 400 are formed at the approximate midpoints of the wrinkle coupons 500 that will ultimately be cut from the thermoplastic laminate 300. However, the wrinkles 400 can be formed at any location on the wrinkle coupons 500, and are not limited to being located at the approximate midpoints. In the arrangement shown, multiple side-by-side wrinkle coupons 500 may be cut from a thermoplastic laminate 300. Each wrinkle coupon 500 has a rectangular shape having coupon sides 503 defining the coupon width 504, and having coupon ends 506 defining the coupon length 502. Each wrinkle coupon 500 may be cut out of the thermoplastic laminate 300 such that the coupon length 502 is perpendicular (e.g., within 10 degrees) to the lengthwise direction of the wrinkle-forming element 230. The wrinkle-forming elements 230 are preferably removed from the thermoplastic laminate 300 prior to cutting the wrinkle coupons 500 out of the thermoplastic laminate 300. However, in other examples, the wrinkle coupons 500 may be cut from the thermoplastic laminate 300, after which cut sections of the wrinkle-forming elements 230 can be removed from the wrinkle coupons 500. In still other examples, the cut sections of the wrinkle-forming elements 230 may be retained within the wrinkles 400 of the wrinkle coupons 500 during mechanical testing.

The method 100 can be implemented for producing a set of wrinkle coupons 500 for a given laminate configuration by repeating the above-described steps 104, 106, 108, 110, and 112 at least one time for the same laminate configuration, each time using a wrinkle-forming element 230 having a different wrinkle-forming-element configuration 232 than previously used, to thereby produce a wrinkle coupon 500 having a different wrinkle geometry 402 than previously produced. The different wrinkle geometries 402 in the set are predefined, and may be configured to duplicate the wrinkle geometries 402 that can occur or have occurred in a thermoplastic laminate 300 during manufacturing.

Referring to FIG. 31, for each laminate configuration, the effect of a wrinkle geometry 402 on the mechanical properties (e.g., strength, stiffness, etc.) of a given laminate configuration can be determined by conducting standard mechanical testing of wrinkle coupons 500, by mounting each wrinkle coupon 500 in a testing machine 610, measuring the strength capability of the wrinkle coupon 500, and comparing the strength capability of the wrinkle coupon 500 to the strength capability of a non-wrinkled coupon (not shown) cut from a thermoplastic laminate 300 having the same laminate configuration as the wrinkle coupon 500. The strength capability of non-wrinkled coupons may be determined using the same testing machine 610 and same testing parameters used for testing the wrinkle coupons 500.

The testing machine 610 in FIG. 31 includes an upper gripper 612 and a lower gripper 612 for respectively coupling to the coupon ends 506 of a wrinkle coupon 500 or non-wrinkled coupon (not shown). The testing machine 610 includes an actuator 616 for vertically moving the upper gripper 612 relative to the lower gripper 612 to generate a test load 618 on a coupon, and may include a load cell 614 for measuring the magnitude of the test load 618 applied to the wrinkle coupon 500.

The steps for characterizing the effect of a wrinkle geometry 402 on the mechanical properties of a thermoplastic laminate 300 include mounting one or more strain gauges (not shown) on a wrinkle coupon 500. The strain gauges can be communicatively coupled to a computer (not shown) for measuring strain in the wrinkle coupon 500 during the application of the test load 618. The method includes applying the test load 618 to the wrinkle coupon 500 via the testing machine 610. For example, the test load 618 can be a tensile load, applied to the wrinkle coupon 500 at a predetermined loading rate, and up to a predetermined maximum load, or until failure occurs in one or more of the plies 308 of the wrinkle coupon 500, all the while recording the strain in the wrinkle coupon 500. The method further includes determining the strength capability of the wrinkle coupon 500 by calculating the stress levels (e.g., in pounds per square inch) in the wrinkle coupon 500, in correspondence to the strain measurements during loading and/or at failure of the wrinkle coupon 500.

Although FIG. 31 shows a tensile load applied to the wrinkle coupon 500 for measuring the tensile strength of the wrinkle coupon 500, any one of a variety of other types of test loads 618 may be applied to the wrinkle coupon 500 via the appropriate type of testing machine. For example, a compressive load, a shear load, a bending load, and/or other types of test loads 618 may be applied to the wrinkle coupon 500 to determine respectively the compressive strength, the shear strength, the bending strength, or other strength characteristics of the wrinkle coupon 500. Alternatively or additionally, the stiffness characteristics of the wrinkle coupon may be determined by measuring the stiffness response of the wrinkle coupon 500 when subjected to any one or more types of test loads, such as the above-mentioned tensile load, compressive load, shear load, and/or bending load.

The method additionally includes normalizing the test data, and comparing the strength capability of the wrinkle coupon 500 to the strength capability of a non-wrinkled coupon. As mentioned above, the non-wrinkled coupon and the wrinkle coupon 500 are identical to each other in terms of laminate configuration, which includes the type of thermoplastic prepreg material 324, and the ply stacking sequence 330 of the coupons. For each wrinkle geometry 402, the method includes calculating a knockdown factor to apply to thermoplastic laminates 300 having the same laminate configuration and having a wrinkle 400 of approximately (e.g., within 20 percent) the same wrinkle geometry 402 as in the wrinkle coupon 500. The knockdown factor associated with each wrinkle geometry 402 represents a reduction or decrease in one or more mechanical properties (i.e., strength, stiffness) of a thermoplastic laminate 300. In one example, the knockdown factor may be calculated as the ratio of the strength capability of the wrinkle coupon 500 to the strength capability of a non-wrinkled coupon having the same laminate configuration as the wrinkle coupon 500.

Knockdown factors can be used in the evaluation of a thermoplastic part containing a wrinkle 400 of approximately the same wrinkle geometry 402 (e.g., the wrinkle length 404 and/or wrinkle depth 408) as in the corresponding wrinkle coupons 500. Advantageously, knockdown factors can aid in quickly and efficiently dispositioning a thermoplastic part used in a production program. As mentioned above, dispositioning a thermoplastic part can include either using the thermoplastic part as is, reworking the thermoplastic part (e.g., by reinforcing the region containing the wrinkle), or rejecting the thermoplastic part. The use of knockdown factors provides a means for quickly determining if a wrinkle 400 in a thermoplastic part is acceptable as is, thereby potentially avoiding the need to perform time-consuming rework on the thermoplastic part. In other cases where the wrinkle geometry 402 is more severe, the use of knockdown factors may provide a means for quickly determining that reworking the thermoplastic part will bring the strength capability of the thermoplastic part back up to design minimums, thereby avoiding the need to remove and replace the thermoplastic part. In still another example, the availability of knockdown factors for characterizing the effect of wrinkle geometries 402 of varying severity can expand the design space when evaluating concepts for new structures.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A frame-laminate assembly for forming a wrinkle in a thermoplastic laminate, comprising:
   a thermoplastic laminate having a laminate outer surface and opposing laminate side edges, and comprised of multiple plies, each ply comprised of reinforcing fibers pre-impregnated with thermoplastic resin;
   a laminate support frame, having a frame panel configured to support the thermoplastic laminate, the frame panel extending between opposing frame side members respectively located adjacent to the laminate side edges;
   at least one wrinkle-forming element configured to extend across the laminate surface between the laminate side edges;
   a pair of wrinkle-forming-element attachment mechanisms respectively on the frame side members, and configured to secure opposing ends of the wrinkle-forming element to the laminate support frame while applying tension to the wrinkle-forming element; and
   wherein the wrinkle-forming-element attachment mechanisms are configured to support the wrinkle-forming element over the laminate outer surface during the application of heat to the thermoplastic laminate, and the application of compaction pressure on the wrinkle-forming element against the laminate outer surface, for urging the wrinkle-forming element into the thermoplastic laminate, thereby causing the wrinkle-forming element to form a wrinkle as an out-of-plane deformation in one or more of the plies.

2. The frame-laminate assembly of claim 1, wherein:
   the pair of wrinkle-forming-element attachment mechanisms are configured to maintain the tension in the wrinkle-forming element while compaction pressure is applied on the wrinkle-forming element against the thermoplastic laminate.

3. The frame-laminate assembly of claim 1, wherein:
   the thermoplastic laminate includes at least one ply in which the reinforcing fibers are unidirectional fibers, defining a zero-degree direction of the thermoplastic laminate; and
   the pair of wrinkle-forming-element attachment mechanisms are positioned on the frame side members such that the wrinkle-forming element is perpendicular to the zero-degree direction.

4. The frame-laminate assembly of claim 1, wherein the wrinkle-forming element has one of the following wrinkle-forming-element configurations:
   a wire extending across the laminate outer surface;
   at least one tow strip extending across the laminate outer surface;
   a wire extending across the laminate outer surface, and at least one tow strip placed over the wire.

5. The frame-laminate assembly of claim 4, wherein the wire comprises one of the following:
   a straight inner wire covered by a coiled outer wire;
   a straight wire with no coiled outer wire.

6. The frame-laminate assembly of claim 4, wherein:
   the wire has a diameter of between 0.005 and 0.060 inch.

7. The frame-laminate assembly of claim 4, wherein the wire comprises:
   a guitar string.

8. The frame-laminate assembly of claim 4, wherein:
   the tow strip has a strip width of less than approximately 0.10 inch, and a strip thickness of less than approximately 0.010 inch.

9. A method of manufacturing a wrinkle coupon using the frame-laminate assembly of claim 1, the method comprising:
   providing the frame-laminate assembly;
   applying the heat to the thermoplastic laminate to soften the thermoplastic resin;
   applying the compaction pressure on the wrinkle-forming element against the laminate outer surface in a manner urging the wrinkle-forming element into the thermoplastic laminate, and causing the wrinkle-forming element to form the wrinkle as an out-of-plane deformation in one or more of the plies;
   allowing the thermoplastic laminate to cool; and
   cutting a wrinkle coupon out of a region of the thermoplastic laminate containing the wrinkle.

10. The method of claim 9, further comprising:
    maintaining the tension in the wrinkle-forming element while applying the compaction pressure on the wrinkle-forming element against the thermoplastic laminate.

11. The method of claim 9, wherein the thermoplastic laminate includes at least one ply in which the reinforcing fibers are unidirectional fibers, defining a zero-degree direction of the thermoplastic laminate, the step of placing the wrinkle-forming element across the laminate outer surface further comprises:
    orienting the wrinkle-forming element perpendicular to the zero-degree direction of the thermoplastic laminate.

12. The method of claim 9, wherein placing the wrinkle-forming element across the laminate outer surface comprises placing one of the following wrinkle-forming-element configurations across the laminate outer surface:
    placing a wire across the laminate outer surface;
    placing at least one tow strip across the laminate outer surface;
    placing a wire across the laminate outer surface, and placing at least one tow strip over the wire.

13. The method of claim 12, wherein the wire comprises one of the following:
    a straight inner wire covered by a coiled outer wire;
    a straight wire with no coiled outer wire.

14. The method of claim 12, wherein:
    the wire has a diameter of between 0.005 and 0.060 inch.

15. The method of claim 12, wherein placing the wire across the laminate outer surface comprises:
    placing a guitar string across the laminate outer surface.

16. The method of claim 12, wherein:
    the tow strip has a strip width of less than approximately 0.10 inch, and a strip thickness of less than approximately 0.010 inch.

17. A method of manufacturing a set of wrinkle coupons using the frame-laminate assembly of claim 13, the method, comprising:
    providing the frame-laminate assembly in which the thermoplastic laminate is comprised of multiple plies of thermoplastic prepreg material, and the thermoplastic laminate has a laminate configuration comprising at least the following:
    type of thermoplastic prepreg material, ply stacking sequence, and laminate thickness;
    applying the heat to the thermoplastic laminate to soften the thermoplastic resin;
    applying the compaction pressure on the wrinkle-forming element against the laminate outer surface in a manner urging the wrinkle-forming element into the thermoplastic laminate, and causing the wrinkle-forming element to form the wrinkle as an out-of-plane deformation in one or more of the plies;

allowing the thermoplastic laminate to cool;

cutting a wrinkle coupon out of a region of the thermoplastic laminate containing the wrinkle;

determining a wrinkle geometry of the wrinkle in at least one wrinkled ply, by measuring a wrinkle length and a wrinkle depth of the wrinkle in the wrinkled ply; and repeating the above steps at least one time for the same laminate configuration, each time using a wrinkle-forming element having a different wrinkle-forming-element configuration than previously used, to thereby produce a wrinkle coupon having a different wrinkle geometry than previously produced.

18. The method of claim 17, wherein placing the wrinkle-forming element across the laminate outer surface comprises placing one of the following wrinkle-forming-element configurations across the laminate outer surface:

placing a wire across the laminate outer surface;

placing at least one tow strip across the laminate outer surface;

placing a wire across the laminate outer surface, and placing at least one tow strip over the wire.

19. The method of claim 17, wherein the thermoplastic laminate includes at least one ply in which the reinforcing fibers are unidirectional fibers, defining a zero-degree direction of the thermoplastic laminate, the step of placing the wrinkle-forming element across the laminate outer surface further comprises:

orienting the wrinkle-forming element perpendicular to the zero-degree direction of the thermoplastic laminate.

20. The method of claim 17, wherein placing the wrinkle-forming element across the laminate outer surface comprises placing one of the following wrinkle-forming-element configurations across the laminate outer surface:

placing a wire across the laminate outer surface;

placing at least one tow strip across the laminate outer surface;

placing a wire across the laminate outer surface, and placing at least one tow strip over the wire.

* * * * *